(12) United States Patent
Boecker et al.

(10) Patent No.: US 10,297,370 B1
(45) Date of Patent: May 21, 2019

(54) FORMING A RIGID CABLE HARNESS WITH A CURABLE SLEEVE

(71) Applicant: tesa SE, Norderstedt (DE)

(72) Inventors: Patrick Boecker, Grand Rapids, MI (US); Andreas Meier, Grand Rapids, MI (US); Brett Dibble, Huntington Woods, MI (US); Robert Oliver, Lowell, MI (US)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 15/841,948

(22) Filed: Dec. 14, 2017

(51) Int. Cl.
*B32B 1/00* (2006.01)
*H02G 3/04* (2006.01)
(Continued)

(52) U.S. Cl.
CPC ..... *H01B 13/01209* (2013.01); *B29C 63/044* (2013.01); *B29C 63/08* (2013.01); *B29C 65/4835* (2013.01); *B29C 65/4845* (2013.01); *B32B 1/00* (2013.01); *B32B 27/08* (2013.01); *B32B 27/22* (2013.01); *B32B 37/12* (2013.01); *B32B 37/16* (2013.01); *H01B 13/0016* (2013.01); *B29K 2075/00* (2013.01); *B29K 2105/20* (2013.01); *B29K 2105/256* (2013.01); *B29K 2627/18* (2013.01); *B29K 2995/0077* (2013.01); *B29L 2031/3462* (2013.01); *B29L 2031/707* (2013.01); *B32B 2037/1253* (2013.01); *B32B 2307/54* (2013.01); *B32B 2327/18* (2013.01); *B32B 2375/00* (2013.01); *B60R 16/0207* (2013.01);
(Continued)

(58) Field of Classification Search
CPC ............ H01B 13/012; H01B 13/01209; B29C 63/04; B29C 63/044; B29C 63/06; B29C 63/065; Y10T 156/1008; Y10T 156/101; Y10T 156/103; Y10T 156/1033; B29L 2031/3462; B29L 2031/707; B60R 16/0207; B60R 16/0215; H02G 3/04; H02G 3/0406
USPC .............................. 156/54, 184, 307.1, 307.7
See application file for complete search history.

(56) References Cited

U.S. PATENT DOCUMENTS

2013/0277106 A1* 10/2013 Toyama .............. B60R 16/0207
174/72 A
2015/0013874 A1* 1/2015 Siebert ............... H01B 13/0129
156/52
(Continued)

FOREIGN PATENT DOCUMENTS

WO 2017021487 A1 2/2017

*Primary Examiner* — Carson Gross
(74) *Attorney, Agent, or Firm* — McGuireWoods LLP

(57) ABSTRACT

Provided are methods for forming a rigid cable harness. An example method includes providing a curable sleeve comprising a curable compound, an adhesive, and a backing; wherein the curable adhesive tape has a longitudinal direction. The method further includes placing a plurality of cables on the sleeve in the longitudinal direction and wrapping the curable sleeve around the placed plurality of cables to form a cable harness, wherein the wrapping comprises wrapping the plurality of cables with the curable sleeve in the longitudinal direction. The method additionally includes positioning the cable harness into a desired shape and curing the curable compound of the cable harness to form the rigid cable harness, wherein the rigid cable harness has the desired shape.

16 Claims, 6 Drawing Sheets

(51) Int. Cl.
*B29C 63/04* (2006.01)
*B29C 63/08* (2006.01)
*B29C 65/48* (2006.01)
*B29K 75/00* (2006.01)
*B29L 31/00* (2006.01)
*B29L 31/34* (2006.01)
*B32B 27/08* (2006.01)
*B32B 27/22* (2006.01)
*B32B 37/12* (2006.01)
*B32B 37/16* (2006.01)
*B60R 16/02* (2006.01)
*H01B 13/00* (2006.01)
*B29K 105/00* (2006.01)
*B29K 105/20* (2006.01)
*B29K 627/18* (2006.01)
*H01B 13/012* (2006.01)

(52) U.S. Cl.
CPC ............ *B60R 16/0215* (2013.01); *H02G 3/04* (2013.01); *H02G 3/0406* (2013.01); *Y10T 156/103* (2015.01); *Y10T 156/1033* (2015.01)

(56) References Cited

U.S. PATENT DOCUMENTS

| | | |
|---|---|---|
| 2015/0013875 A1 | 1/2015 | Siebert et al. |
| 2016/0326413 A1 | 11/2016 | Schuh et al. |

\* cited by examiner

FORMING A RIGID CABLE HARNESS WITH A CURABLE SLEEVE

TECHNICAL FIELD

The present disclosure relates to the formation of rigid cable harnesses using a curable sleeve, and more particularly, to the use of a curable sleeve to form a cable harness having a desired shape and then curing the cable harness to form a rigid cable harness having the desired shape.

BACKGROUND

Cable harnesses are used to bind a plurality of cables into a bundle. Cable harnesses may also be used to cover, at least partially, the cables so as to prevent damage to or exposure of the cables. Further, cable harnesses may be used to direct the path of the cables to avoid potential areas of danger. One industry that uses cable harnesses is the automobile industry. For example, a cable harness may be used to bundle cables and direct them away from certain areas of the automobile during installation. The cable harness may be shaped such that when installed, the cable harness may direct the cables to avoid hot surfaces or areas of the automobile having sharp edges or pinch points. Further, the cable harness may be used to maximize interior space by keeping the cables flat and tucked away to optimize the available space. Finally, bundling the cables with a protective covering may prevent the cables from being affected by vibration, moisture, or abrasion.

Cable harnesses used in the field today may comprise molded plastic amongst other materials. An injection mold may be prepared having a specific shape, and the injected plastic may conform to said shape to provide the desired cable harness. The cable harness may then be fit into the automobile when desired for use. The process may have several drawbacks. One drawback is that a new cable harness mold may be needed any time there is a design change to the automobile affecting the shape of the cable harness. For example, if a new model of the automobile is designed that necessitates a change to the shape in which the cables are to be bundled, an entirely new mold must be prepared to provide a cable harness having the new shape. If a significant design overhaul was made to the automobile, multiple new cable harnesses may be required, which would in turn require multiple new injection molds to be prepared. The cost of preparing the new injection molds may be significant.

As such, the expense of even small design or engineering changes can increase significantly for every cable harness that must be redesigned to fit the new model of the automobile.

One solution may be to use a tape comprising a curable adhesive that is wrapped helically around the harness. Upon curing, the tape would stiffen and thereby stiffen the whole harness. However, the use of the tape may lead to leaking of the curable adhesive during the curing step, as well as the curable adhesive contacting the cables, which can lead to undesired interactions.

SUMMARY

In an embodiment, a method for forming a rigid cable harness is provided. The method comprises providing a curable sleeve comprising a curable compound, an adhesive, and a backing; wherein the curable adhesive tape has a longitudinal direction; placing a plurality of cables on the sleeve in the longitudinal direction; wrapping the curable sleeve around the placed plurality of cables to form a cable harness, wherein the wrapping comprises wrapping the plurality of cables with the curable sleeve in the longitudinal direction; positioning the cable harness into a desired shape; and curing the curable compound of the cable harness to form the rigid cable harness, wherein the rigid cable harness has the desired shape.

Additionally or alternatively, the method may include one or more of the following features individually or in combination. The curing of the curable compound may further comprise applying radiant energy selected from the group consisting of heat, ultraviolet radiation, infrared radiation, magnetic induction, and any combination thereof. The degree of rigidity of the rigid cable harness may be selected by choosing the duration, temperature, or source of radiant energy to cure the curable compound. The curable compound may be covered with a covering during the placing of the plurality of cables on the curable sleeve; wherein the plurality of cables does not contact the curable compound. The rigid cable harness may comprise an exterior and an interior; wherein the exterior of the rigid cable harness does not comprise the curable adhesive; wherein the curable compound and the adhesive does not substantially extrude out of the interior of the rigid cable harness or substantially contact the exterior of the rigid cable harness. The curable compound may be thermally vulcanizable, meltable, and comprise a polybutadiene-polyurethane and ground sulfur; wherein the curable compound further comprises at least one additional component selected from the group consisting of vulcanization accelerator, filler, epoxy resin, tackifier resin, bitumen, plasticizer, and any combination thereof. The polybutadiene-polyurethane may be the meltable reaction product of a polyaddition reaction of at least one at least doubly hydroxyl-functionalized polybutadiene or polybutadiene derivative and at least one diisocyanate. The degree of rigidity of the rigid cable harness may be selected by choosing the concentration of the ground sulfur. The curable compound may comprise a polymer forming a continuous phase and a reactive resin forming the discontinuous phase in the uncured state of the curable compound; wherein the curable compound further comprises at least one of a curing agent, an initiator, or an accelerator. The degree of rigidity of the rigid cable harness may be selected by choosing the concentration and species of the reactive resin. The backing may comprise a textile material selected from the group consisting of cloths, scrims, tapes, braids, tufted textiles, felts, woven fabrics, woven or knitted spacer fabrics with lamination, knitted fabrics, nonwovens, and any combinations thereof.

In an embodiment, a method for cabling a structure is provided. The method comprises providing a cable harness comprising: a curable sleeve comprising a curable compound, an adhesive, and a backing; wherein the curable sleeve has a longitudinal direction; and a plurality of cables placed on the interior of the curable sleeve in the longitudinal direction and wrapped by the curable sleeve in the longitudinal direction; positioning the cable harness into a desired shape; curing the curable compound of the cable harness to form a rigid cable harness, wherein the rigid cable harness has the desired shape, wherein the degree of rigidity of the rigid cable harness is selected by choosing the duration, temperature, or source of radiant energy to cure the curable compound; and placing the rigid cable harness on the interior of the structure.

Additionally or alternatively, the method may include one or more of the following features individually or in combination. The curable compound may be covered with a covering during the placing of the plurality of cables on the curable sleeve in the longitudinal direction; wherein the plurality of cables does not contact the curable compound. The rigid cable harness may comprise an exterior and an interior; wherein the exterior of the rigid cable harness does not comprise the curable adhesive; wherein the curable compound and the adhesive does not substantially extrude out of the interior of the rigid cable harness or substantially contact the exterior of the rigid cable harness. The curable compound may be thermally vulcanizable, meltable, and comprise a polybutadiene-polyurethane and ground sulfur; wherein the curable compound further comprises at least one additional component selected from the group consisting of vulcanization accelerator, filler, epoxy resin, tackifier resin, bitumen, plasticizer, and any combination thereof; wherein the degree of rigidity of the rigid cable harness is selected by choosing the concentration of the ground sulfur. The polybutadiene-polyurethane may be the meltable reaction product of a polyaddition reaction of at least one at least doubly hydroxyl-functionalized polybutadiene or polybutadiene derivative and at least one diisocyanate. The curable compound may comprise a polymer forming a continuous phase and a reactive resin forming the discontinuous phase in the uncured state of the curable compound; wherein the curable compound further comprises at least one of a curing agent, an initiator, or an accelerator; wherein the degree of rigidity of the rigid cable harness is selected by choosing the concentration and species of the reactive resin. The backing may comprise a textile material selected from the group consisting of cloths, scrims, tapes, braids, tufted textiles, felts, woven fabrics, woven or knitted spacer fabrics with lamination, knitted fabrics, nonwovens, and any combinations thereof.

In an embodiment, a rigid cable harness is provided. The rigid cable harness comprises a curable sleeve comprising a curable compound, an adhesive, and a backing; wherein the curable sleeve has a longitudinal direction; wherein the curable sleeve is a single-sided tape having a first longitudinal edge and a second longitudinal edge; wherein the curable compound is placed proximate the first longitudinal edge; and a plurality of cables placed on the interior of the curable sleeve in the longitudinal direction and wrapped by the curable sleeve in the longitudinal direction; wherein the rigid cable harness has a desired shape; and wherein the desired shape was fixed by curing the curable compound after the plurality of cables were wrapped by the curable sleeve in the longitudinal direction.

Additionally or alternatively, the rigid cable harness may include one or more of the following features individually or in combination. The curable compound may be thermally vulcanizable, meltable, and comprise a polybutadiene-polyurethane and ground sulfur; wherein the curable compound further comprises at least one additional component selected from the group consisting of vulcanization accelerator, filler, epoxy resin, tackifier resin, bitumen, plasticizer, and any combination thereof.

BRIEF DESCRIPTION OF THE DRAWINGS

Illustrative examples of the present disclosure are described in detail below with reference to the attached drawing figures, which are incorporated by reference herein, and wherein:

FIG. 4 is a cross-section schematic illustrating the rolling of the curable sleeve with a plurality of cables placed thereon in accordance with certain embodiments of the present disclosure;

Figure 1:
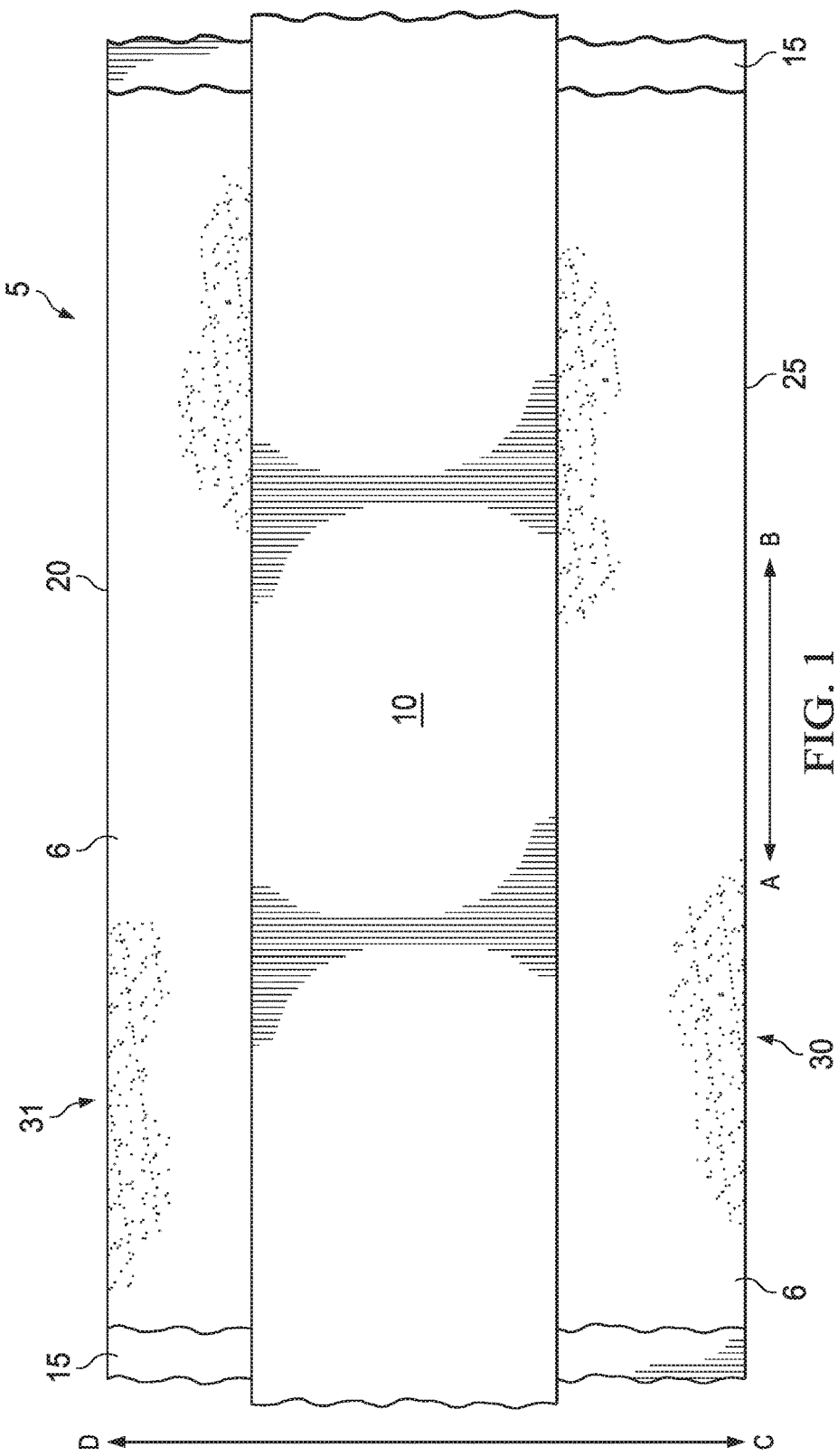
FIG. 1 is a schematic illustrating an example of a curable sleeve extending in the longitudinal direction along arrow A-B in accordance with certain embodiments of the present disclosure.

The illustrated figures are only exemplary and are not intended to assert or imply any limitation with regard to the environment, architecture, design, or process in which different examples may be implemented.

DETAILED DESCRIPTION

The present disclosure relates to the formation of rigid cable harnesses using a sleeve comprising a curable compound, and more particularly, to the use of a sleeve comprising a curable compound to form a cable harness having a desired shape and then curing the cable harness to form a rigid cable harness having the desired shape.

Unless otherwise indicated, all numbers expressing quantities of components, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein comprise the use of a curable sleeve that may be formed into a desired shape and then cured to maintain said desired shape. Advantageously, cables may be bundled within the curable sleeve such that the curable sleeve may be used to provide a rigid cable harness having a desired shape. Further advantageously, the degree of rigidity of the rigid cable harness may be controlled by the parameters of the curing process, for example, duration, temperature, heat source, intensity, etc. Additionally, the curable compound itself can be adjusted as desired to control rigidity. For example in the vulcanizable, meltable polybutadiene-polyurethane embodiment described below, the concentration and purity of the ground sulfur may be adjusted to control the rigidity of the cured rigid cable harness. Likewise, in the continuous polymer phase-reactive resin embodiment described below, the species and concentration of the epoxide may be adjusted to control the rigidity of the cured rigid cable harness. Moreover, a relatively small amount of the curable compound may be applied to a surface area of the backing to produce the curable sleeve. As such, exposure of the cables to the curable adhesive is kept to a minimum, or in some embodiments, does not substantially occur. Moreover, the cables may be wrapped in the longitudinal direction. The longitudinal wrapping may be performed faster than helical wrapping. Also, the curable compound may not substantially leak to the outside of the cable harness at the area of backing overlap or be substantially extruded from the edges of the cable harness. In some examples, the curable compound does not leak or extrude at all to the outside of the cable harness at the area of backing overlap or from the edges of the cable harness. Finally, the curable compound may be covered to prevent contact between the curable compound and the cables during curing. Another advantage of the present embodiments is that the functionality of stiffening and wrapping is separated. Specifically, the adhesion needed for the wrapping may be performed by one part of the curable sleeve, while the curing needed for stiffening is performed by a separate curable compound that may or may not have adhesive properties.

The term "cable" as used herein, generally refers to any cable, wire, rope, or other elongated material that may be positioned in a rigid harness as formed by the curable sleeve. Although examples may describe the use of the curable sleeve for forming rigid cable harnesses for automobiles, it is to be understood that the curable sleeve may be used to form a rigid cable harness of any elongated material for any type of application. Some applications may be for use with other types of vehicles, including airplanes, ships, etc. Generally, the rigid cable harness may be used in any application where elongated material may need to be directed around and/or shielded from contact with other components or surfaces.

FIG. 1 is a schematic illustrating an example of the curable sleeve, generally 5, laid flat and extending in the longitudinal direction along arrow A-B in accordance with certain embodiments of the present disclosure. FIG. 1 illustrates the adhesive side of the curable sleeve 5 (i.e., the side of curable sleeve 5 with the adhesive 6 and the curable compound 10 exposed). Curable sleeve 5 is a single-sided adhesive tape possessing one layer of adhesive 6 which covers most or all of backing 15 and is adjacent to backing 15. Curable sleeve 5 further possesses a strip of a curable compound 10 extending in the longitudinal direction along arrow A-B. The curable compound 10 is disposed adjacent to the adhesive 6. Curable sleeve 5 comprises a first longitudinal edge 20 and a second longitudinal edge 25. The curable compound 10 is disposed on the adhesive 6 such that the curable compound 10 is proximate first longitudinal edge 20 and is not proximate second longitudinal edge 25. As such, there is a portion of the adhesive 6 that is proximate the second longitudinal edge 25 which does not comprise the curable compound 10. This area is referred to as the leading side, generally 30. There is also an area of the adhesive 6 comprising a relatively smaller surface area that is adjacent to the curable compound 10 and proximate the first longitudinal edge 20. This portion of the adhesive 6 is referred to as the cable placement area, generally 31.

Figure 2:
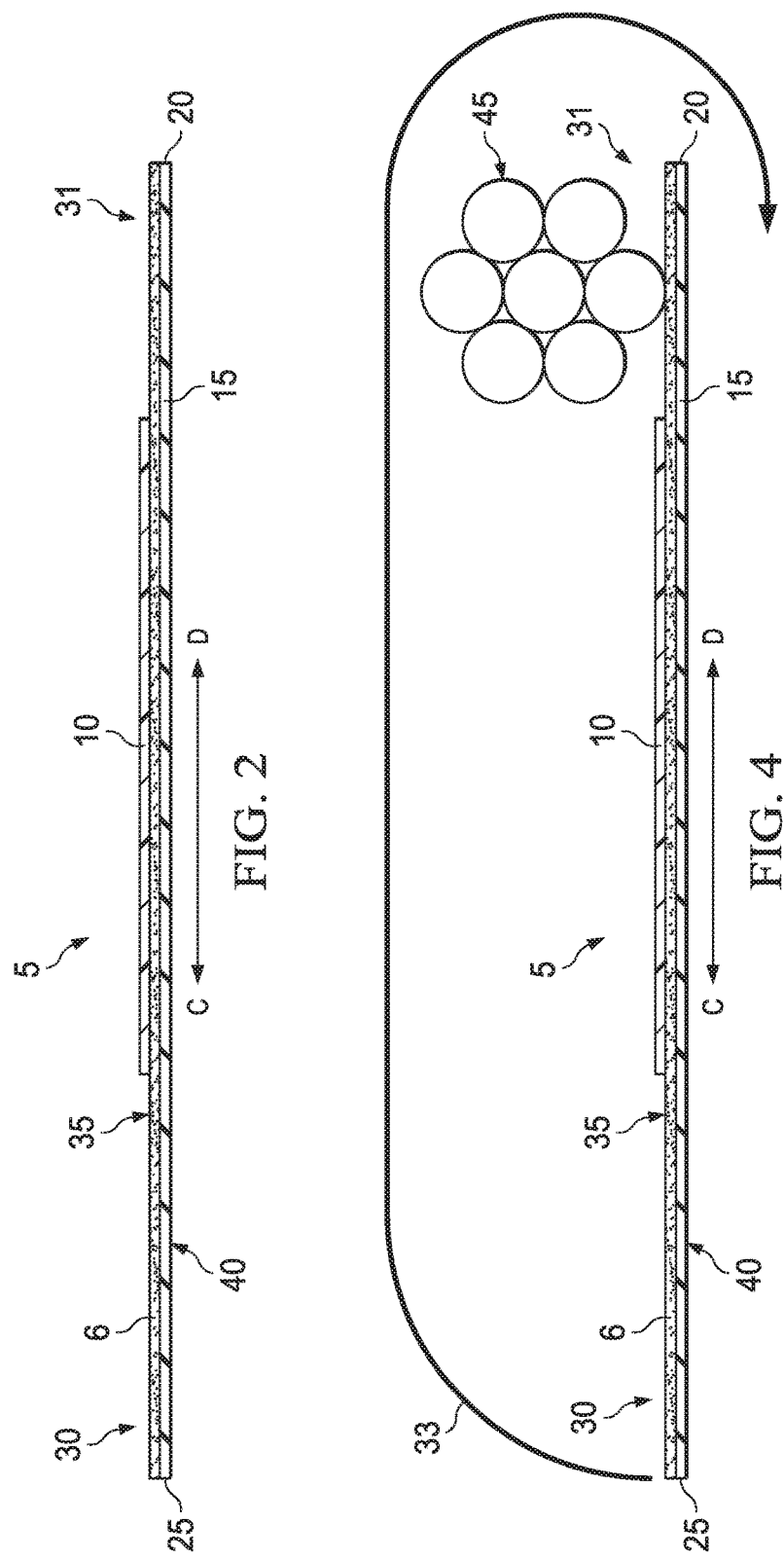
FIG. 2 is a cross-section schematic of the curable sleeve extending in the transverse direction along arrow C-D in accordance with the examples disclosed herein.

FIG. 2 is a cross-section schematic of curable sleeve 5 extending in the transverse direction along arrow C-D. As illustrated, the curable sleeve 5 comprises a layer of a adhesive 6 disposed adjacent to the backing 15 on the adhesive side 35 of the curable sleeve 5. Further, the curable sleeve 5 also comprises a strip of curable compound 10 proximate the first longitudinal edge 20. The strip of curable compound 10 is positioned on the adhesive side 35 of backing 15 where the adhesive 6 and the curable compound 10 is exposed. Backing 15 also comprises a non-adhesive side 40 that does not comprise adhesive. In some optional embodiments, adhesive side 35 may further comprise a liner (not illustrated) which may cover the exposed portion of the layer of adhesive 6 and may also, in some further embodiments, cover the whole of the adhesive side 35 including curable compound 10. The liner may be of importance in embodiments where curable sleeve 5 is distributed as a roll, for example, if the curable sleeve 5 is rolled such that the adhesive side 35 contacts the non-adhesive side 40. The liner may also be of importance in embodiments where the liner covers the curable compound 10 and/or adhesive 6 to prevent contact of the cables with the curable compound 10 and/or adhesive 6. In said embodiments, a portion of the liner may remain on the adhesive side 35 to protect the cables from contacting the curable compound 10 and/or the adhesive 6.

Figure 3:
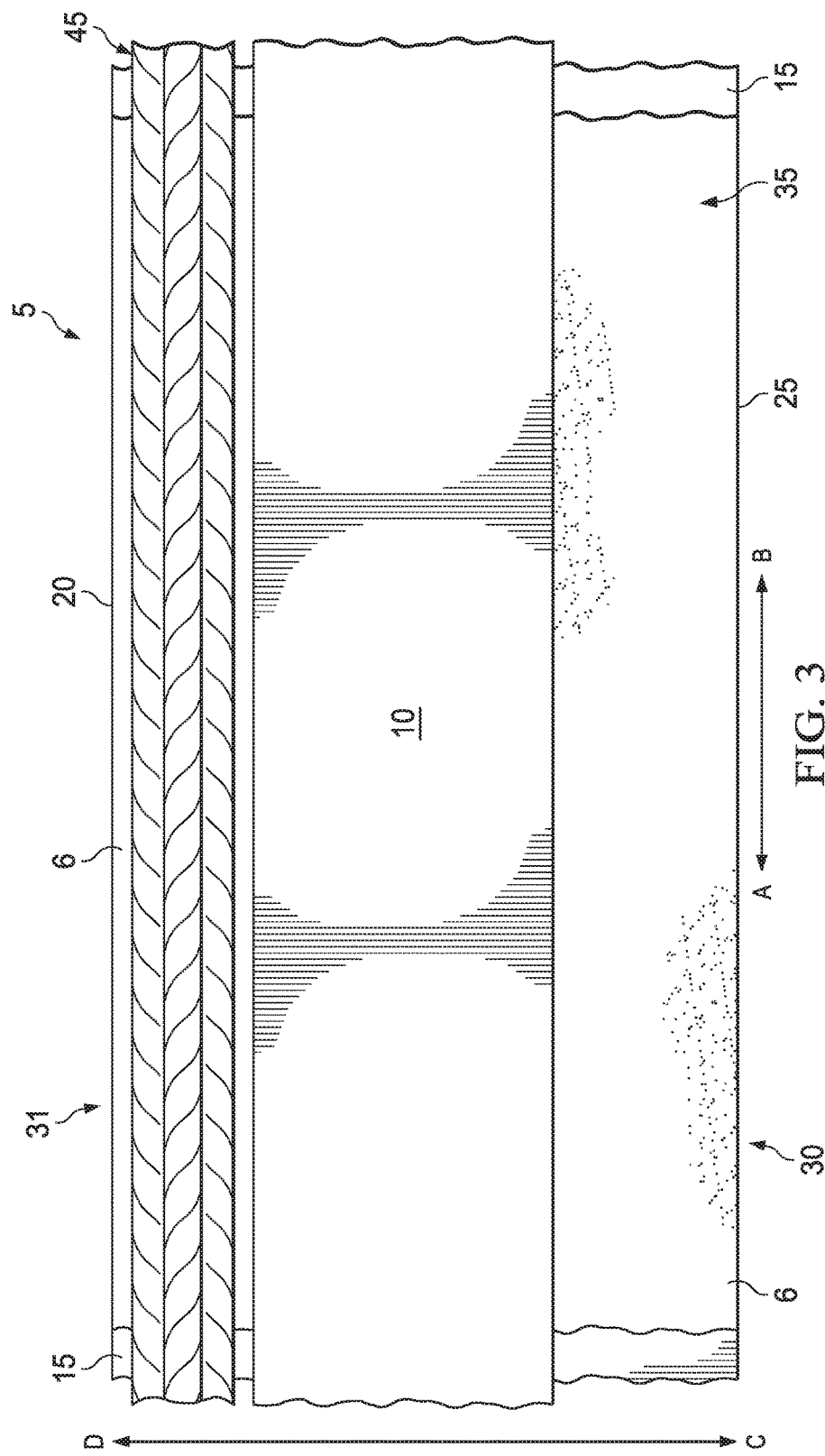
FIG. 3 is a schematic illustrating the curable sleeve with a plurality of cables placed thereon in accordance with certain embodiments of the present disclosure.

FIG. 3 is a schematic illustrating an example of the curable sleeve 5 with a plurality of cables 45 placed thereon in accordance with certain embodiments of the present disclosure. When desired for use as a cable harness, a desired length of curable sleeve 5 may be cut or otherwise separated from any other portion of curable sleeve 5. The curable sleeve 5 may then be laid flat such that the adhesive side 35 is exposed and the non-adhesive side 40 (obscured in illustration) may rest on a flat surface supporting the curable sleeve 5. In some embodiments, a liner may be removed from the adhesive side 35 to expose adhesive 6 and curable compound 10. A plurality of cables 45 may be placed adjacent to the cable placement area 31. The individual cables 45 within the plurality may be positioned to extend in the longitudinal direction illustrated along arrow A-B and bundled or grouped as desired. After the placement of the plurality of cables 45, the curable sleeve 5 may be formed into a cable harness. This process may be described generally as wrapping the curable sleeve 5 around the cables 45 in the longitudinal direction to form a sleeve around the cables 45. More particularly, the method may be performed by holding the leading side 30 and rolling it in the direction of the cables 45 such that it is rolled over the cables 45 (i.e., rolling towards direction D of arrow C-D). The leading side 30 is rolled such that it wraps around the plurality of cables 45 as tightly as desired. Rolling may continue until the adhesive side 35 of the curable sleeve 5 is able to contact the non-adhesive side 40 of the curable sleeve 5 to form a sleeve around the cables 45.

FIG. 4 is a cross-section schematic illustrating the rolling of the curable sleeve 5 with a plurality of cables 45 placed thereon in accordance with certain embodiments of the present disclosure. As discussed above, when the plurality of cables 45 have been placed adjacent to the cable placement area 31 the leading side 30 of the curable sleeve 5 may be rolled it in the direction of the cables 45 such that it is rolled over the cables 45 (i.e., rolling towards direction D of arrow C-D). This direction of rolling is illustrated as arrow 33. The leading side 30 is rolled such that it wraps around the plurality of cables 45 as tightly as desired. Rolling may continue until the adhesive side 35 of curable sleeve 5 is able to contact the non-adhesive side 40 of the curable sleeve 5 to form a sleeve around the cables 45. This method of rolling may be faster to perform than helical methods as it requires wrapping the cables 45 with less windings. Moreover, this method of rolling and the limited use of the curable compound 10 and adhesive 6 may result in no extrusion or leakage of the curable compound 10 and/or adhesive 6 from the overlap of the longitudinal edges 20 and 25 and also from any of the lateral sides of edges formed by cutting or removing a portion of curable sleeve 5 from a roll, for example. In some examples, a minimal amount of leakage or extrusion may occur. However, the amount of leakage would not be substantial and could be removed from the exterior by wiping with a cloth. In other examples, no leakage or extrusion of the curable compound 10 and the adhesive 6 may occur and the curable compound 10 and adhesive 6 does not contact the rolled exterior of the cable harness (e.g., cable harness 50 described below).

Figure 5:
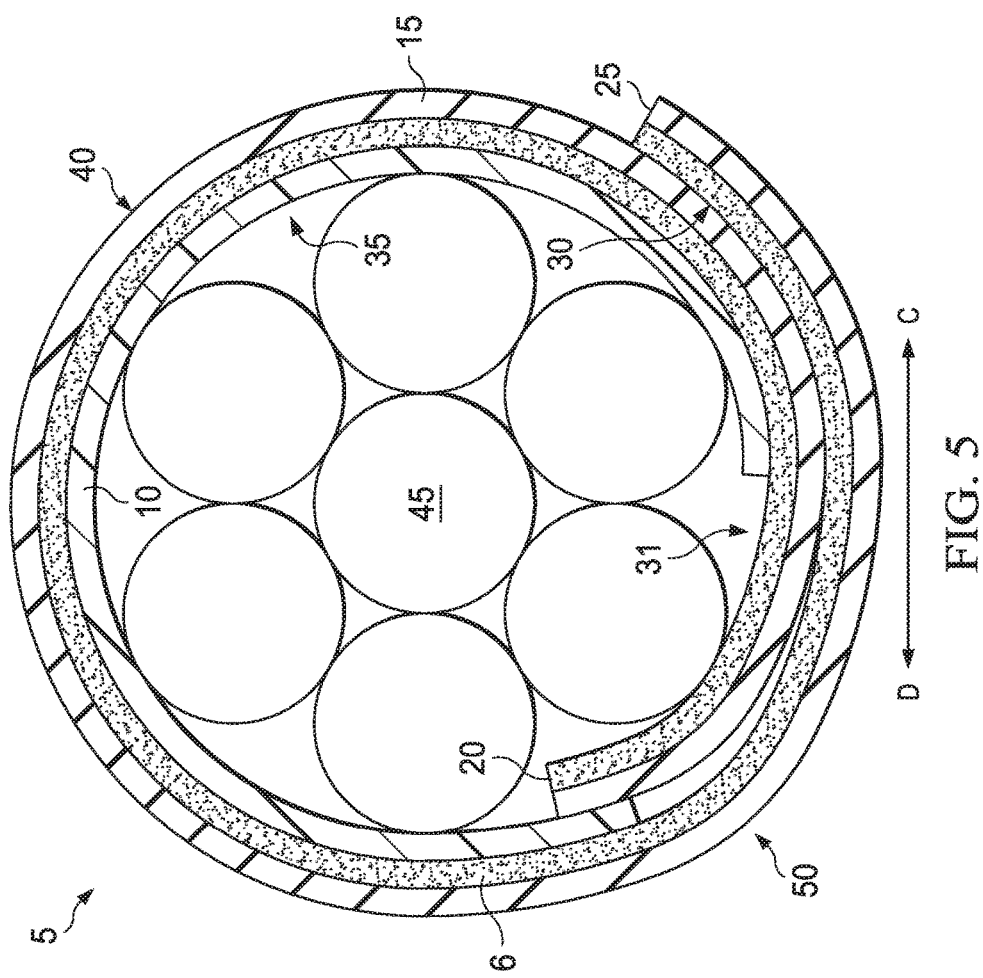
FIG. 5 is a cross-section schematic illustrating the curable sleeve when used as a cable harness for a plurality of cables in accordance with certain embodiments of the present disclosure.

FIG. 5 is a cross-section schematic illustrating an example of the curable sleeve 5 used as a cable harness 50 for a plurality of cables 45 in accordance with certain embodiments of the present disclosure. As illustrated, the leading side 30 of the curable sleeve 5 has been rolled towards the cables 45 disposed thereon the cable placement area 31 (i.e., in the direction D of arrow C-D) such that the plurality of cables have been bundled and wrapped by the curable sleeve 5 in a sleeve to form the cable harness 50. As the leading side 30 was rolled such that the adhesive side 35 is on the interior of the formed cable harness 50, the layer of adhesive 6 and the strip of curable compound 10 is also placed on the interior of the cable harness 50 and the layer of adhesive 6 and the strip of curable compound 10 is not exposed or on the outside of cable harness 50. As such, only the non-adhesive side 40 of backing 15 is exposed, and the cable harness 50 may be handled without contacting the curable compound 10. Further, as the cable harness 50 forms a sleeve around the bundled cables wrapping them in the longitudinal direction, the layer of adhesive 6 and the strip of curable compound 10 does not leak to the outside of the cable harness 50 allowing for clean handling of the cable harness 50 when formed. If any leakage does occur, it would not be substantial and may be removed by wiping.

In some optional embodiments, the plurality of cables 45 may be covered with a protective covering (not illustrated) such as cloth or paper before placement on the cable placement area 31. This protective covering may prevent contact between the cables 45 and the layer of adhesive 6 and the strip of curable compound 10 during the curing process. Alternatively, only the strip of curable compound 10 may be covered with the protective covering so that the plurality of cables 45 do not contact the strip of curable compound 10. In all optional embodiments, the protective covering may be removed after curing or may be allowed to remain in place to prevent contact of the plurality of cables 45 with the strip of curable compound 10. The protective covering may be any material which prevents contact of the strip of curable compound 10 and/or the adhesive 6 with the plurality of cables 45. Examples of covering materials may include, but are not limited to, textile materials (e.g., paper, tissue, cloth), plastics, or any combination thereof.

Figure 6:
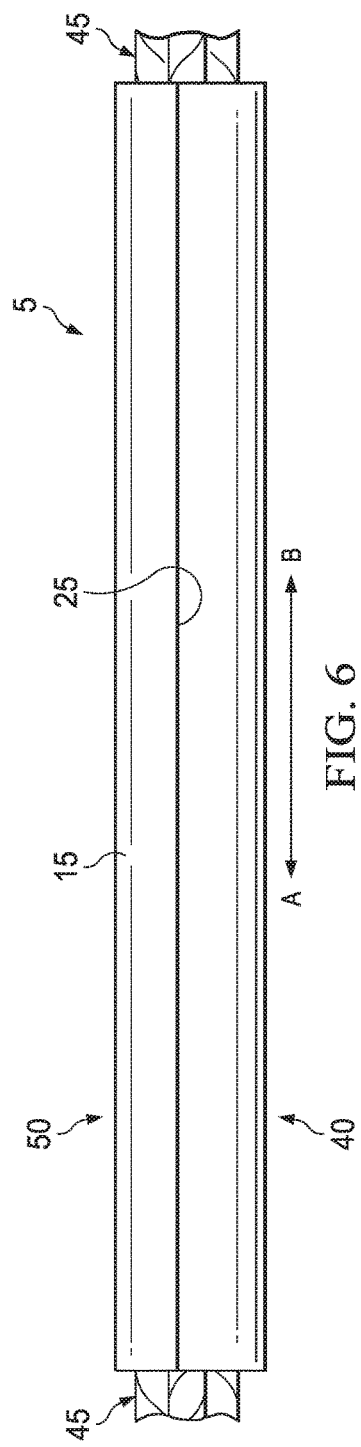
FIG. 6 is a schematic illustrating another view of the cable harness with a plurality of cables disposed therein in accordance with certain embodiments of the present disclosure.

FIG. 6 is a schematic illustrating another view of cable harness 50 with a plurality of cables 45 disposed therein in accordance with certain embodiments of the present disclosure. As illustrated, the formed cable harness 50 contains a plurality of cables 45 disposed on the interior of the cable harness 50. The terminal ends of the individual cables 45 may extend past the edge of the portion of the curable sleeve 5 used to form cable harness 50. These terminal ends may be connected or spliced to other wires or components. Further, only the non-adhesive side 40 of the backing 15 is exposed, and the cable harness 50 may be handled without contacting the curable adhesive or the non-curable adhesive (i.e., curable compound 10 as illustrated in FIGS. 1-5.)

Figure 7:
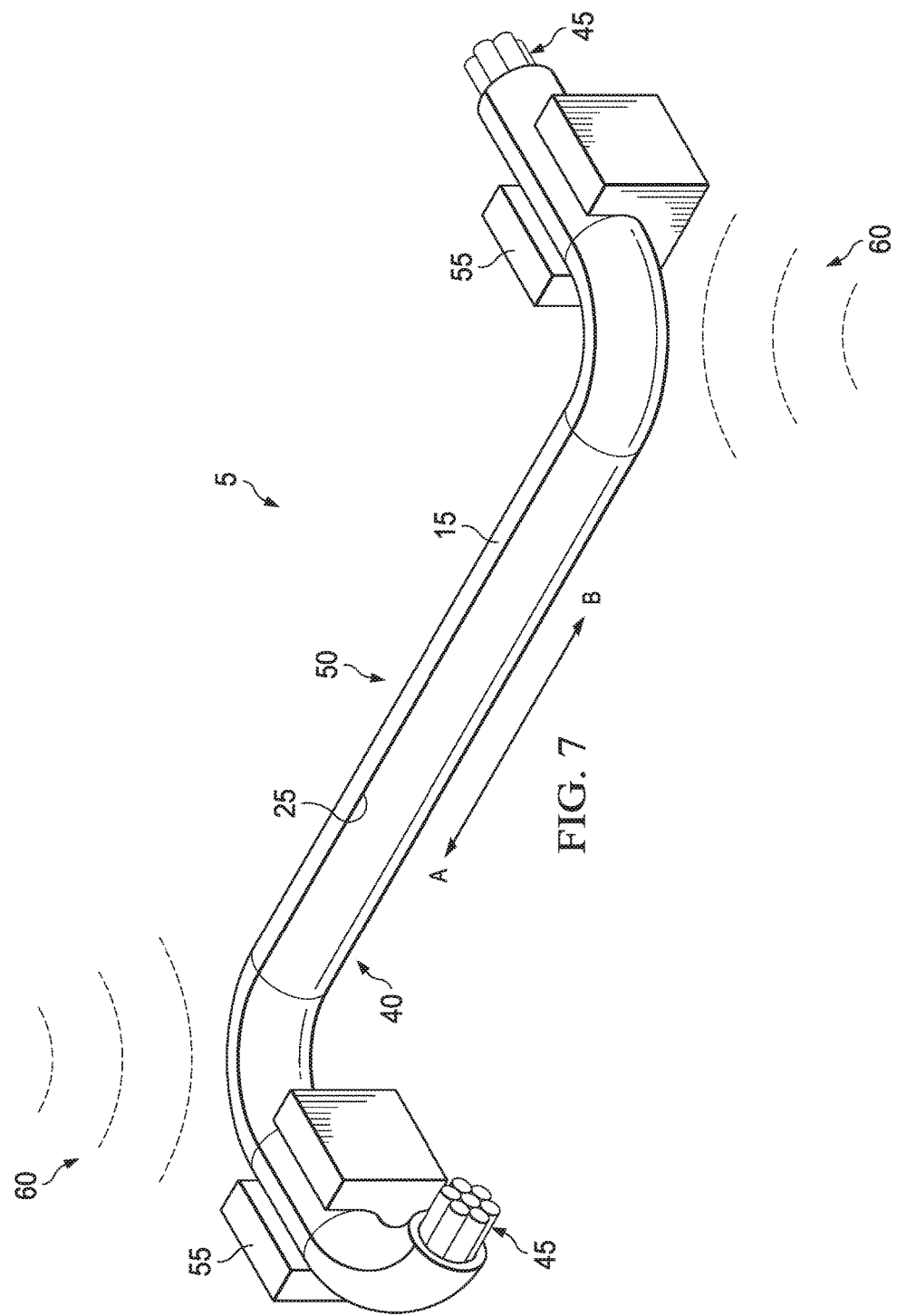
FIG. 7 is a schematic illustrating an isometric view of the cable harness after it is positioned into a desired shape in accordance with certain embodiments of the present disclosure.

FIG. 7 is a schematic illustrating an isometric view of the cable harness 50 after it is positioned into a desired shape in accordance with certain embodiments of the present disclosure. After forming the cable harness 50, it may be positioned into a desired shape for an application. For example, cable harness 50 may be positioned into a shape sufficient to avoid contact with a heated surface or a sharp edge when placed in the interior of an automobile. The material of backing 15 and curable compound 10 is sufficiently flexible to allow the cable harness 50 to be positioned in any desirable shape for an application. Once said desirable shape is formed, the desirable shape may be held in position by the use of any restraining tool 55 (e.g., clamps). In order to fix the desirable shape of cable harness 50, radiant energy (e.g., heat), generally 60, may be applied to cure the curable adhesive (e.g., curable compound 10 as illustrated in FIGS. 1-5) which may fix the cable harness 50 into the desired shape providing a rigid cable harness as discussed below.

Figure 8:
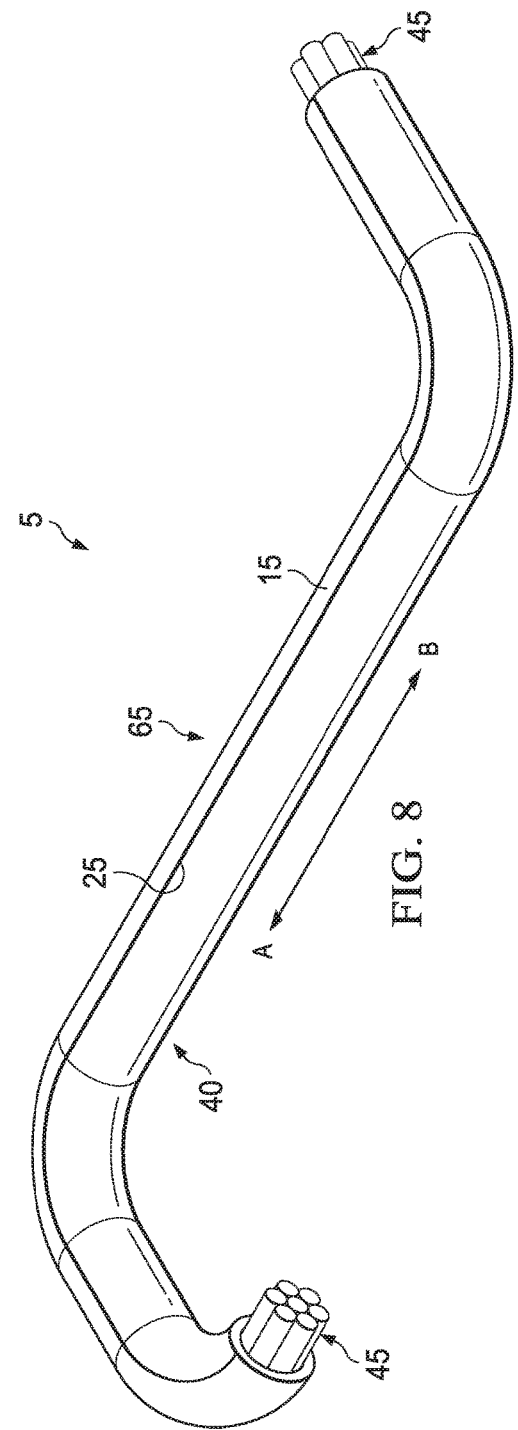
FIG. 8 is a schematic illustrating an isometric view of a rigid cable harness formed after curing the cable harness of FIG. 7 into a desired shape in accordance with certain embodiments of the present disclosure.

FIG. 8 is a schematic illustrating an isometric view of a rigid cable harness 65 formed after curing the cable harness 50 of FIG. 7 into a desired shape in accordance with certain embodiments of the present disclosure. Rigid cable harness 65 is sufficiently rigid after the curing process that it is able to hold the desired shape imparted to it without the use of restraining tools (i.e., restraining tools 55 as illustrated in FIG. 6). The degree of rigidity of rigid cable harness 65 may be adjusted by altering the parameters of the curing process, for example, by altering the duration of the curing process, the intensity of radiant energy (i.e., radiant energy 60 as illustrated in FIG. 7), the type of radiant energy used, etc. Rigid cable harness 65 may be disposed on the interior of an automobile or any other structure/component as desired, and the terminal ends of cables 45 may be spliced or otherwise connected to other cables or components as desired.

The curing of the curable compound 10 to form the rigid cable harness 65 may be performed using any type of radiant energy 60 sufficient for curing the curable compound 10. For example, heat, ultraviolet radiation, infrared radiation, magnetic induction, etc., or a combination thereof, may be used to cure the curable compound 10. As discussed above, the rigidity of the rigid cable harness 65 may be adjusted as desired based on the parameters of the chosen curing process. For example, adjusting the duration, temperature, intensity, and type of curing process may lead to the formation of the rigid cable harness 65 being more or less rigid as desired for a particular application. In embodiments, the curing process and the parameters of said process are chosen such that the rigid cable harness 65 is produced having a specific desired degree of rigidity.

The use of longitudinal wrapping and a smaller section of curable compound 10 prevents the curable adhesive from the strip of curable compound 10 from leaking outside of the cable harness 50 before and after curing. Moreover, in some examples, the adhesive 6 may also be prevented from leaking outside of the cable harness 50 before and after curing by using a thinner layer of non-curable compound 10, by reducing the surface area of non-curable compound 10 such that it does not extend to or outside of one or both longitudinal edges 20 and 25 or any lateral edge or side when the cable harness 50 is formed. Optionally, allowing curable compound 10 to soak into the backing 15 to a desired degree may also help ensure that the curable compound 10 does not leak or extrude from the longitudinal edges 20 and 25 or any lateral side or edge after forming cable harness 50. Moreover, the use of a curable compound 10 and adhesive 6, separates the functionality of stiffening and wrapping. Specifically, the adhesion needed for the wrapping may be performed by one part of the curable sleeve, while the curing needed for stiffening is performed by a separate curable compound that may or may not have adhesive properties and can be designed as desired without need for being sufficiently adhesive unless also desired.

Although FIGS. 3-8 illustrate the formation of a cable harness 50 and a rigid cable harness 65 with a plurality of cables 45 disposed therein, this disclosure expressly contemplates alternative embodiments where the cables 45 are not disposed therein during the formation of the cable harness 50 and/or the rigid cable harness 65. For example, in some embodiments the curable sleeve 5 may be rolled into the shape of cable harness 50 without any elongated material on the inside of the rolled curable sleeve 5. In further alternative embodiments, the curable sleeve 5 may be rolled into the shape of cable harness 50 with a standard-sized elongated material on the inside of the roll to provide a standard interior diameter to the cable harness 50. The standard elongated material may then be pushed or pulled out of the cable harness 50 and/or the rigid cable harness 65, and the cables 45 may be inserted therein. In still further alternative embodiments, the terminal end of said standard-sized elongated material may be tied or otherwise coupled to the cables 45 such that if it is pulled out of the cable harness 50 and/or the rigid cable harness 65, the cables 45 may then be pulled into the interior of the cable harness 50 and/or the rigid cable harness 65.

In embodiments, the adhesive 6 is any adhesive sufficient for use with the curable sleeve 5. Examples may include, but are not limited to, waterborne adhesives, solventborne adhesives, hot melt adhesives, acrylic adhesives, natural and/or synthetic rubber adhesives, silicone adhesives, or any combination thereof. It is to be understood that adhesive 6 should be chosen such that it does not negatively interfere with curable compound 10 or cables 45 should it be exposed to cables 45. Further, adhesive 6 should be compatible with backing 15.

The backing 15 as described above in FIGS. 1-7, comprises any carrier material which is at least partially provided with the curable compound 10 on one side as described above. The backing 15 encompasses all sheet-like structures, examples being two-dimensionally extended films or film sections, tapes with extended length and limited width, tape sections, diecuts (in the form of edge surrounds or borders of an arrangement to be bonded, for example), other shapes, multi-layer arrangements and the like. For different applications it is possible to combine a very wide variety of different carriers, such as, for example, textiles, films, woven fabrics, nonwovens and papers, with the adhesive 6.

In one embodiment, the backing 15 is a textile comprising a woven, nonwoven, or knitted fabric. Backing 15 of these kinds may be torn by hand with relative convenience. This may be of particular importance for the described utility of bundling cables.

Backing 15 may comprise all known textile carriers such as, cloth, scrims, tapes, braids, tufted textiles, felts, woven fabrics (encompassing plain weave, twill, and satin weave), woven and knitted spacer fabrics with lamination, knitted fabrics (encompassing warp knits and other knits), or nonwovens, the term "nonwoven" comprehending at least sheet-like textile structures and also stitch-bonded webs and similar systems.

Spacer fabrics are mat-like layer structures comprising a cover layer of a fiber or filament web, an underlayer and individual retaining fibers or bundles of such fibers between these layers, these fibers being distributed over the area of the layer structure, being needled through the particle layer and joining the cover layer and the underlayer to one another. As an additional, although not mandatory feature, the retaining fibers may contain particles of inert minerals, such as sand, gravel or the like, for example. The retaining fibers needled through the particle layer hold the cover layer and the underlayer at a distance from one another and are joined to the cover layer and the underlayer.

Examples of nonwovens include, but are not limited to, consolidated staple fiber webs, but also filament webs, meltblown webs and spunbonded webs, which generally require additional consolidation. Possible consolidation methods known for webs include mechanical, thermal and chemical consolidation. Whereas with mechanical consolidations the fibers are held together purely mechanically, usually by entanglement of the individual fibers, by the interlooping of fiber bundles, or by the stitching-in of additional threads, it is possible by thermal and by chemical techniques to obtain adhesive (with binder) or cohesive (binder-less) fiber-fiber bonds. Given appropriate formulation and an appropriate process regime, these bonds may be restricted exclusively, or at least predominantly, to fiber nodal points, so that a stable, three-dimensional network is formed while nevertheless retaining the relatively loose, open structure in the web.

In addition to the above-described textile materials, examples of suitable backing 15 materials may include polymeric filmic materials. Examples of the polymeric filmic materials, may include, but are not limited to, polyethylene, polypropylene, polyolefin, polyvinyl chloride, polyethylene terephthalate, polyethylene naphthalate, ethylene-vinyl alcohol, polyvinylidene chloride, polyvinylidene fluoride, polyacrylonitrile, polycarbonate, polyamide, polyethersulphone, polyimide, aramid, biopolymers (e.g., cellulose, hemp, cotton, sisal, flax, silk, hemp, linen, coconut or wool), rubber, glass, composites thereof, or a combination thereof.

As discussed above, in some optional examples, and to prevent the curable compound 10 sticking to the backing 15, the curable sleeve 5, prior to winding, may be lined with a liner which is wound up together with the curable sleeve 5. The liner may have siliconization on one or both sides.

In embodiments, the curable compound 10 that may be vulcanized thermally within a temperature range of from about 20° C. to about 230° C. The bond strengths achievable with the curable compound 10 are to be adjustable arbitrarily and in accordance with requirements, within wide limits. The range encompasses tensile shear strengths of between greater than about 0 to at least about 30.0 N/mm$^2$. The curable compound 10 may be produced in a compounding and extrusion operation within a temperature range of from about 40° C. to about 100° C. The base elastomer of the curable compound 10 must therefore be in the form of a melt within this latter temperature range. During processing as a melt or during subsequent storage at temperatures up to 40° C., there must be no onset of the vulcanization reaction or any other crosslinking reaction. In the temperature range from room temperature (about 20° C. to about 25° C., ideally 23° C.) to about 30° C., the curable compound 10 must be sufficiently solid or of a high viscosity that it can be wound to a roll in the form of a film coated onto a release liner, or in the form of a film coated onto the backing 15, without running out at the side or being squeezed out by the winding pressure. The curable compound 10 is therefore a thermally vulcanizable, meltable compound. In some embodiments, the curable compound 10 may be a pressure-sensitive adhesive.

A meltable reaction product for the purposes of this disclosure has a complex viscosity of at least 3000 Pas, preferably at least 6000 Pas, and ideally at least 10,000 Pas, as measured with a rheometer in an oscillation test under a sinusoidally oscillating shearing stress in a plate/plate arrangement, with a temperature of 23° C. and an oscillation frequency of 10.0 rad/s. At temperatures in the range of between about 40° C. and about 100° C. and with an oscillation frequency of 10.0 rad/s, the complex viscosity is reduced down to less than 1000 Pas, preferably down to less than 500 Pas, and ideally down to less than 200 Pas. The oscillation frequency corresponds to the angular frequency.

The complex viscosity $\eta^*$ is defined as follows: $\eta^* = G^*/\omega$
($G^*$=complex shear modulus, $\omega$=angular frequency).

The other definitions are as follows: $G^* = \sqrt{(G')^2 + (G')^2}$
($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\tau$=shear stress, $\gamma$=deformation, $\delta$=phase angle=phase shift between shear stress vector and deformation vector).

$\omega = 2\pi \cdot f$ (f=frequency).

In optional embodiments, where the curable compound 10 is a pressure-sensitive adhesive, pressure-sensitive adhesiveness is described as the property of a substance which enables it to enter into a durable bond to a substrate even under relatively weak applied pressure. Substances possessing this quality are referred to as pressure-sensitive adhesives (hereafter "PSAs"). PSAs can be detached from the substrate again after use, substantially without residue. At room temperature, in general, PSAs have a permanent inherent adhesiveness, thus having a certain viscosity and tack, so that they wet the surface of the particular substrate even under low applied pressure. The capacity of a PSA to adhere to materials and to transmit forces derives from the adhesion capacity and the cohesion of the PSA.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also a development of elastic forces of resilience. The two processes have a certain relationship to one another in terms of their respective proportion, in dependence not only on the precise composition, the structure and the degree of crosslinking of the respective PSA, but also on the rate and duration of the deformation and on the temperature.

The proportional viscous flow is necessary for the achievement of adhesion. Only the viscous components, brought about by macromolecules with relatively high mobility, permit effective wetting and flow onto the substrate where bonding is to take place. A high viscous flow component results in high tack (also referred to as surface stickiness) and hence often also to a high peel adhesion. Highly crosslinked systems, crystalline polymers, or polymers with glasslike solidification lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. As a result of these forces of resilience, an adhesive bond is able to withstand a long-term load acting on it, in the form of a long-term shearing load, for example, to a sufficient extent over a relatively long time period.

For more precise description and quantification of the extent of elastic and viscous components, and also of the proportion of the components relative to one another, the variables of storage modulus (G') and loss modulus (G") can be employed, and may be determined by means of Dynamic Mechanical Analysis (DMA). G' is a measure of the elastic component, G" a measure of the viscous component, of a substance. The two variables are dependent on the deformation frequency and on the temperature.

The variables can be determined with the aid of a rheometer. In that case, for example, the material under investigation, in the form of a plane-parallel layer, is exposed in a plate/plate arrangement to a sinusoidally oscillating shearing stress. In the case of instruments operating with shear stress control, the deformation is measured as a function of time, and the time offset of this deformation relative to the introduction of the shearing stress is recorded. This time offset is referred to as phase angle $\delta$.

The storage modulus G' is defined as follows: $G' = (\tau/\gamma) \cdot \cos(\delta)$ ($\tau$=shear stress, $\gamma$=deformation, $\delta$=phase angle–phase shift between shear stress vector and deformation vector). The definition of the loss modulus G" is as follows: $G'' = (\tau/\gamma) \cdot \sin(\delta)$ ($\tau$=shear stress, $\gamma$=deformation, $\delta$=phase angle–phase shift between shear stress vector and deformation vector).

A substance and the layer produced from it are deemed in general to be pressure-sensitively adhesive, and are defined as pressure-sensitively adhesive for the purposes of this specification, if at room temperature, here by definition at 23° C., in the deformation frequency range from 100 to 101 rad/sec, G' is located at least partly in the range from 103 to 107 Pa and if G" likewise is located at least partly within this range. Partly means that at least a section of the G' curve lies within the window formed by the deformation frequency range from 100 (inclusive) up to 101 (inclusive) rad/sec (abscissa) and also by the range of the G' values from 103 (inclusive) to 107 (inclusive) Pa (ordinate), and when at least a section of the G" curve is likewise located within this window.

Within this region, which in a matrix plot of G' and G" (G' plotted as a function of G"), may also be referred to as the viscoelastic window for PSA applications or as the PSA window according to viscoelastic criteria, there are in turn different sectors and quadrants which characterize more closely the PSA properties to be expected from the associated substances. Within this window, substances with high G" and low G' are notable, for example, in general for high peel adhesion and low shear strength, whereas substances with high G" and high G' are notable both for high peel adhesion and for high shear strength.

Vulcanizable, Meltable Polybutadiene-Polyurethane Curable Compound

In one specific example, the curable compound 10 generally comprises meltable polybutadiene-polyurethane, ground sulfur, and in each case, optionally, at least one vulcanization accelerator, at least one filler, at least one epoxy resin, at least one tackifier resin, bitumen, at least one plasticizer, and also further auxiliaries and additives.

Of the optional classes of substance—vulcanization accelerator, filler, epoxy resin, tackifier resin, bitumen, plasticizer, and also further auxiliaries and additives—it is possible in each case for there to be only one or for there to be any desired combination of two or more classes of substance included. Similarly, within each class of substance, there may be in each case one compound or any desired number of different compounds included.

This specific example of the curable compound 10 is a thermally vulcanizable compound which at room temperature has a solid or at least very highly viscous consistency that may be processed as a melt in a compounding and extrusion operation in a temperature range between approximately 40° C. and 100° C., and may be vulcanized thermally in a temperature range between 20° C. and 230° C. and is therefore curable. The curing thus achieved includes a chemical crosslinking.

As used for this specific example of a vulcanizable, meltable polybutadiene-polyurethane, "thermal vulcanization" means sulfur vulcanization—in other words, the crosslinking of unsaturated compounds, by means of sulfur, that is activated and completed by a temperature increase. For activating the sulfur vulcanization, it is possible to add vulcanization accelerators and vulcanizing auxiliaries and additives. These substances may bring about a reduction in the activation temperature and/or accelerated curing and crosslinking.

A meltable polybutadiene-polyurethane for the purposes of this specification means a meltable reaction product which is prepared by a polyaddition reaction of at least one at least doubly hydroxyl-functionalized polybutadiene or polybutadiene derivative and at least one diisocyanate, and which at room temperature is sufficiently solid and dimensionally stable to allow it to be wound to a roll at room temperature, on a release liner, or on the backing 15, without running out at the side or being squeezed out as a result of the winding pressure. At least doubly hydroxyl-functionalized polybutadiene derivatives are those compounds which may be derived from polybutadiene-diols or polyols and which possess a plurality of C4 units, each containing a carbon/carbon double bond, and at the same time may also carry other additional functional groups such as, for example, epoxide groups or additional side chains such as vinyl groups, for example, or other additional structural elements.

Ground sulfur is soluble or insoluble, ground, elemental sulfur. The degree of purity ought to be at least 95%, more preferably at least 99%. The sulfur ought to be ground finely enough that the sieve residue for a mesh size of 100 μm is not more than 2%. Coarser grades do also operate in principle, but may result in the curable compound possessing a roughness which can be distinctly perceived visually, and in somewhat lower attainable bond strengths. The purity and concentration of the ground sulfur may be adjusted to alter the rigidity of the cured rigid cable harness as desired. The higher the concentration or content of the sulfur, the more rigid the rigid cable harness may be. As such, when preparing a curable compound of the vulcanizable, meltable polybutadiene-polyurethane embodiment, the concentration and purity of the ground sulfur may be selected to provide a rigid cable harness having the desired degree of rigidity.

Vulcanization accelerators which may be present, optionally, in the curable compound 10, are understood in this specification to be all substances which are known to accelerate vulcanization. They may at the same time also be sulfur donors. The concept of the invention also embraces those known sulfur donors which in the technical literature are not explicitly also classified simultaneously as accelerators.

The most important vulcanization accelerators may be ordered in the following known classes of substance: mercapto accelerators, sulphenamide accelerators, sulphenimide accelerators, thiuram accelerators, dithiocarbamate accelerators, dithiocarbamyl¬sulphenamide accelerators, xanthogenate accelerators, guanidine accelerators, amine accelerators, thiourea accelerators, dithiophosphate accelerators, and sulphur donors. Examples of mercapto accelerators are 2-mercaptobenzothiazole (MBT), zinc 2-mercaptobenzothiazole (ZMBT) and dibenzothiazyl disulphide (MBTS). Typical sulphenamide accelerators are N-cyclohexyl-2-benzothiazolesulphenamide (CBS), N-tert-butyl-2-benzo*f*thiazolesulphenamide (TBBS), N-oxydiethylene-2-benzothiazolesulphenamide (MBS) and N,N'-di¬cyclohexyl-2-benzothiazolesulphenamide (DCBS). An example of a sulphenimide accelerator is N-tert-butyl-2-benzothiazolesulphenimide. Examples of thiuram accelerators are tetramethylthiuram monosulphide (TMTM), tetramethylthiuram disulphide (TMTD), tetraethyl¬thiuram disulphide (TETD), tetrabenzylthiuram disulphide (TBzTD), tetraisopropylthiuram disulphide (TiPTD), dimethyldiphenylthiuram disulphide (MPTD) and dipentamethylenethiuram tetrasulphide (TPTT). Zinc dimethyldithiocarbamate (ZDMC), zinc diethyldithiocarbamate (ZDEC), zinc dibutyldithiocarbamate (ZDBC), zinc pentamethylenedithiocarbamate (Z5MC), zinc ethylphenyl¬dithiocarbamate (ZEPC), zinc dibenzyldithiocarbamate (ZBEC), zinc diisopropyldithiocarbamate (ZDIPC), piperidine pentamethylenedithiocarbamate (PPC), tellurium dimethyldithiocarbamate (TDMC), tellurium diethyldithiocarbamate (ZDEC), lead dimethyldithiocarbamate (PbDMC), copper dimethyldithiocarbamate (CuDMC), copper dibutyldithiocarbamate (CuDBC), bismuth dimethyldithiocarbamate (BiDMC) and sodium dimethyldithiocarbamate (NaDMC) represent a selection of known dithiocarbamate accelerators. Typical dithiocarbamylsulphenamide accelerators are N-oxydiethylenedithiocarbamyl-N'-oxydiethylenesulphenamide (OTOS) and N-oxydiethylenedithiocarbamyl-N'-tert-butylsulphenamide (OTTBS). Known examples of xanthogenated accelerators are zinc isopropylxanthogenate (ZIX), zinc butylxanthogenate (ZBX), sodium isopropylxanthogenate (NaIX) and polyxanthogenate. Typical guanidine accelerators are diphenylguanidine (DPG), di-o-tolylguanidine (DOTG) and o-tolyl biguanide (OTBG). Amine accelerators are, for example, butyraldehydeaniline (BAA), tricrotonylidenetetramine (TCT), hexamethylenetetramine (HEXA), polyethylenepolyamines (PEP) and cyclohexylethylamine (CEA). N,N'-ethylenethiourea (ETU), N,N'-dibutylthiourea (DBTU), N,N'-diethylthiourea (DETU) and N,N'-diphenylthiourea (DPTU) are examples of thiourea accelerators. Known dithiophosphate accelerators are zinc dibutyldithiophosphate (ZBPD), zinc diisooctyldithiophosphate (ZOPD), dodecyl-ammonium diisooctyldithiophosphate (AOPD) and copper diisopropyldithiophosphate (CuPPD). Sulphur donors include 2-morpholinodithiobenzothiazole (MBSS), N,N'-dithiodimorpholine (DTDM) and caprolactam disulphide (CLD).

Preferred classes of substance are mercapto accelerators, thiuram accelerators and dithiocarbamate accelerators. Mercapto accelerators are regarded as "all-purpose" accelerators, which ensure rapid vulcanization and have no adverse effect on the stability of the as yet unvulcanized curable compound in the temperature range from 160° C. to 180° C. The thiuram accelerators and dithiocarbamate accelerators, individually or in combination, or else in combination with the mercapto accelerators, are regarded as "ultra-accelerators", which ensure rapid vulcanization even at temperatures from 130° C. upwards and which nevertheless ensure sufficient stability during the production of the curable compound, even in the case of compounding temperatures of up to around 90° C., and during subsequent storage at temperatures between room temperature and 30° C. A preferred "all-purpose" vulcanization accelerator is MBTS. Preferred "ultra-accelerators" are TBzTD and ZBEC. In addition to considerations of technical functionality, another factor in the selection is the safety aspect with regard to the possible release of hazardous, carcinogenic cleavage products, especially carcinogenic N-nitrosamines. In this regard, MBTS, TBzTD and ZBEC are considered not to be critical.

Preferred concentrations of the vulcanization accelerators in the thermally vulcanizable, meltable, curable compound 10 amount together to between at least 0.1 wt % and not more than 15.0 wt %, preferably between at least 0.5 and not more than 12.5 wt %, more preferably between at least 1.0 and not more than 10.0 wt %.

In order to accelerate the vulcanization further, it is also possible as required for vulcanization auxiliaries and additives to be added, such as, for example, metal oxides, especially zinc oxide, fatty acids, such as stearic acid, for example, or salts thereof. With regard to the stability of the as yet unvulcanized curable compound and with regard to the adhesion properties after vulcanization, particularly on oiled metal sheets, the use of vulcanization auxiliaries and additives has proved to be rather critical, and so preferred embodiments are free from these substances.

As fillers, which may likewise be included optionally, it is possible to use not only reinforcing fillers, such as carbon black, for example, but also non-reinforcing fillers, such as carbonates, for example, especially chalk, or sulfates such as barium sulfate, for example. Other examples of fillers that are contemplated are silicates, such as talc, kaolin, calcined or partly calcined kaolin, wollastonites or micas, hydroxides or oxides, such as finely ground quartz, for instance, aluminium hydroxide, zinc oxide or calcium oxide. Microspheres are also contemplated as fillers. Microspheres may be solid glass microspheres, hollow glass microspheres and/or polymeric microspheres of all kinds. The polymeric microspheres may be in unexpanded or pre-expanded form. The particle size in the expanded state is usually in the range between 20 and 150 μm. Mixtures of the substances stated may also be used. In particular, mixtures of calcium carbonate and calcium oxide have proved to be particularly advantageous in respect of the attainment of high bond strengths and in respect of the minimization of occasional blistering during the thermal vulcanization. Advantageous weight fractions of calcium carbonate and calcium oxide in the thermally vulcanizable, meltable, curable compound amount together to between 10.0 and 70.0 wt %. Talc has also emerged as being advantageous, for the same reasons. Advantageous weight fractions of talc in the thermally vulcanizable, meltable, curable compound amount to between 10.0 and 50.0 wt %.

The thermally vulcanizable, meltable, curable compound may optionally comprise epoxy resins. The term "epoxy resin" here refers to synthetic resins which carry epoxide groups. Advantageous are bisphenol-based epoxy resins, especially those based on bisphenol A, but also those based on bisphenol F. Particularly advantageous is an epoxy resin which is liquid at room temperature, especially the reaction product of bisphenol A and epichlorohydrin that has a number-averaged, average molecular weight of less than or equal to 700 g/mol (CAS No. 25068-38-6), but also corresponding solid reaction products having higher number-averaged average molecular weights are optional epoxy resins. Other advantageous epoxy resins are epoxyphenol-novolac resins, epoxydicyclopentadiene-phenol-novolac resins, epoxycresol-novolac resins, glycidylamine-based epoxy resins, especially triglycidyl ethers of para-aminophenol, triglycidyl ethers of meta-aminophenol, tetraglycidyl ethers of methylenedianiline, hydroxyphenyl-based epoxy resins, and aliphatic epoxy resins, especially those which are cycloaliphatic. Particularly noteworthy here is 3,4-epoxycyclohexylmethyl 3',4'-epoxycyclohexanecarboxylate (CAS No. 2386-87-0).

An advantageous concentration of the epoxy resin in the thermally vulcanizable, meltable, curable compound is between 1.0 wt % (inclusive) and 20 wt % (inclusive). Particularly advantageous is a concentration between 5.0 wt % (inclusive) and 15.0 wt % (inclusive). The addition of epoxy resins has emerged as being advantageous particularly in respect of the adhesion properties of the thermally vulcanizable, meltable, curable compound on oiled metal sheets after the thermal vulcanization reaction. Moreover, the viscosity of the compounded formulation during the production of the curable compound is lowered advantageously, allowing operation to take place at lower process temperatures.

The chemical conversion to form the meltable polybutadiene-polyurethane advantageously takes place already in the presence of the optional at least one epoxy resin. The advantage of this process is that the at least one epoxy resin can be incorporated in an energy-saving manner, at room temperature. If, alternatively, the polybutadiene-polyurethane were to be prepared first, and then the at least one epoxy resin added, it would be necessary to heat the polybutadiene-polyurethane first of all to a temperature in which it was present as a melt. The disadvantage of that would be the need for a higher energy input. A further advantage is that the softening or melting temperature of the mixture of prepolymer and epoxy resin is significantly lower than the softening or melting temperature of the pure prepolymer, but with the hot-melt character still retained. Subsequent compounding with sulfur and other substances, such as vulcanization accelerators, for example, can therefore take place in an energy-saving manner, and gently, at lower temperatures than without the epoxy resin already incorporated during polybutadiene-polyurethane preparation. In this way, compounding with so-called ultra-accelerators, which occasionally cause onset of vulcanization even at approximately 120° C. within a few minutes, is possible without any unwanted instances of curing or gelling during the compounding operation. If the subsequent compounding of the polybutadiene-polyurethane with sulfur, vulcanization accelerators and vulcanization auxiliaries and additives takes place in a continuously operating mixing assembly, more particularly in a compounding extruder, a further advantage is that none of the generally limited range of metering ports in the compounding extruder would be blocked by the at least one epoxy resin.

The fact that it is technically possible for the isocyanate-based chemical conversion to give the polybutadiene-polyurethane to take place in the presence of one or more epoxy resins is surprising, since isocyanates are described in the technical literature as being reactive towards epoxides, as for example in Ullmann's Encyclopedia of Industrial Chemistry, 6th Edition, Vol. 12, page 271 (table) and in Encyclopedia of Polymer Science and Engineering, Vol. 6, page 345.

Surprisingly it has been found, moreover, that mixtures of epoxy resin and the polybutadiene-polyurethane hot-melt tend towards phase separation if the at least one epoxy resin is mixed in only after the preparation of the polybutadiene-polyurethane. If, on the other hand, the chemical conversion to give the polybutadiene-polyurethane takes place in the presence of the epoxy resin/epoxy resins, the resulting mixtures are in fact generally cloudy, depending on the mixing ratio, but do not separate, and have the advantage of vulcanizing (curing) homogeneously, thereby allowing higher strength and better adhesion to be achieved than when using an inhomogeneous mixture of polybutadiene-polyurethane and epoxy resin. Similarly, other substances as well, such as plasticizers, tackifier resins, bitumen or else fillers or rheological additives, for example, may be added even before or during the chemical conversion to give the polybutadiene-polyurethane.

The thermally vulcanizable, meltable, curable compound may optionally also comprise tackifier resins. The term "tackifier resin" is understood by the skilled person to refer to a resin-based substance which increases the tack. Tackifier resins can be divided into natural resins and synthetic resins.

Typical natural resins are rosin-based resins and their derivatives. Rosins include, for example, natural rosin, polymerized rosin, partially hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin).

Typical synthetic resins are polyterpene resins, although the raw materials here originate from natural sources; hydrocarbon resins and terpene-phenolic resins. These are polymers of low molecular weight. The weight-averaged average molecular weight is generally less than 25 000 g/mol.

Polyterpene resins are based on α-pinene and/or ß-pinene and/or δ-limonene. They may be hydrogenated, non-hydrogenated or partially hydrogenated.

Raw materials for the majority of hydrocarbon resins are by-products obtained in the cracking of naphtha or gas-oil. Hydrocarbon resins may be classified according to whether they are based primarily on aromatic, aliphatic or diene monomers. Aromatic resins are often referred to as C-9 resins, aliphatic resins as C-5 resins, and diene resins as (C-5)2 resins. Mixed aromatic-aliphatic hydrocarbon resins ((C-5/C-9) resins) are likewise included by the concept of the invention. Hydrocarbon resins as well may be hydrogenated, non-hydrogenated or partially hydrogenated.

Further included in the concept of the invention are monomer resins of the styrene/α-methylstyrene type (CAS No.: 9011-11-4). Terpene-phenolic resins, according to DIN 16916 1 1981-06 and ISO/TR 8244:1988, are resins produced by acid-catalyzed addition reaction of phenols with terpenes or rosin.

Tackifier resins preferred in accordance with the invention are polyterpene resins based on α-pinene and/or ß-pinene and/or δ-limonene. Especially preferred are ß-pinene resins (CAS No.: 25719-60-2), an example being the resin Dercolyte S-115 from DRT.

Advantageous concentrations of the tackifier resins in the thermally vulcanizable, meltable, curable compound are between 1.0 (inclusive) wt % and 30.0 (inclusive) wt %. Particularly advantageous are concentrations between 5.0 (inclusive) wt % and 20.0 (inclusive) wt %. The addition of tackifier resins has emerged as being advantageous particularly with regard to the adhesion properties of the thermally vulcanizable, meltable, curable compound on oiled metal sheets prior to the thermal vulcanization reaction. The peel adhesion of the as yet unvulcanized curable compound on oiled metal sheets can be increased significantly in this way.

The thermally vulcanizable, meltable, curable compound may optionally further comprise bitumen. Bitumen is a dark-colored, high-molecular-mass hydrocarbon mixture which is semi-solid to hard and which is obtained as a residue in the distillation of suitable petroleum, further containing chemically bonded sulfur, oxygen, nitrogen and certain traces of metals. In physical terms, bitumen is among the thermoplastics, meaning that its properties are temperature-dependent. On cooling, it becomes brittle; on heating, it passes steplessly through all of the states from solid via highly viscous to highly mobile. Distinctions are made between, among others, the following bitumen varieties and derived products: roadbuilding bitumen, especially soft bitumen, modified bitumen, especially polymer-modified bitumen, industrial bitumen, especially oxidation bitumen or hard bitumen, flux bitumen, and bitumen emulsion.

Preferred in accordance with the invention is roadbuilding bitumen. Particularly preferred is the 50/70 grade, the numbers indicating the minimum and maximum penetration at 25° C. in the units of mm/10 in accordance with DIN EN 1426. Advantageous concentrations of bitumen in the thermally vulcanizable, meltable, curable compound are between 1.0 (inclusive) wt % and 30.0 (inclusive) wt %. Particularly advantageous are concentrations of between 5.0 (inclusive) wt % and 20.0 (inclusive) wt %. The addition of bitumen allows an improvement in the oil absorption when bonding takes place to oiled metal sheets.

The curable compound may optionally further comprise plasticizers. Plasticizers are liquid or solid, inert organic substances of low vapour pressure, primarily of ester-like type, which interact physically with high-polymer substances, without chemical reaction, preferably by virtue of their solvency and swelling capacity, but in some cases even without such behavior, and which are able to form a homogeneous system with said high-polymer substances. Examples of plasticizers include, but are not limited to, phthalic esters, also called phthalates for short, include, among others, dioctyl phthalate (DOP; di(2-ethylhexyl) phthalate), diisononyl phthalate (DINP), diisodecyl phthalate (DIDP), phthalic esters with predominantly linear C6 to C11 alcohols, dibutyl phthalate (DBP), diisobutyl phthalate (DIBP), dicyclohexyl phthalate (DCHP), dimethyl phthalate (DMP) and diethyl phthalate (DEP), and also mixed esters, comprising benzyl (butyl) phthalate (BBP), butyl octyl phthalate, butyl decyl phthalate and dipentyl phthalate, bis(2-methoxyethyl) phthalate and dicapryl phthalate (DCP). An example of trimellitic esters with (predominantly) linear C6 to C11 alcohols is tris(2-ethylhexyl) trimellitate (TOTM). Acyclic aliphatic dicarboxylic esters are, for example, esters of adipic acid such as bis(2-ethylhexyl) adipate (dioctyl adipate, DOA), bis(8-methylnonyl) adipate (diisodecyl adipate, DIDA), dibutyl decanedioate (dibutyl sebacate, DBS), bis(2-ethylhexyl) decanedioate (dioctyl sebacate, DOS). An example of a cyclic aliphatic dicarboxylic ester is diisononyl 1,2-cyclohexanedicarboxylate (DINCH).

Examples of polymer plasticizers are polyesters of adipic, decanedioic, nonanedioic and phthalic acid with diols such as butane-1,3-diol, propane-1,2-diol, butane-1,4-diol, hexane-1,6-diol and others (Mr about 1800-13 000 g/mol). Phosphoric esters, called phosphates for short, are a further group. Mention may be made here, by way of example, of tricresyl phosphate (TCF), triphenyl phosphate (TPP), diphenyl cresyl phosphate (DPCF), 2-ethylhexyl diphenyl phosphate (diphenyl octyl phosphate, DPOF), tris(2-ethylhexyl) phosphate (TOF) and tris(2-butoxyethyl) phosphate. Butyl oleate or butyl stearate are examples of fatty acid esters, which represent a further group. Further examples of this group are methyl esters and butyl esters of acetylated ricinoleic fatty acid and fatty acid glycol esters and also triethylene glycol bis(2-ethylbutyrate). Citric esters are examples of the group of hydroxycarboxylic esters. Further examples are tartaric esters and lactic esters.

A further group of plasticizers are epoxy plasticizers, as for example epoxidized fatty acid derivatives, especially triacyl glycerols and monoesters. Certain of the aforementioned epoxy resins as well may be classed within the group of the plasticizers. Mention may further be made of polyamide plasticizers, as for example, benzenesulphonamides or methylbenzenesulphonamides. Another group of plasticizers are alkylsulphonic esters of phenyl (ASE). Mineral oils as well may be considered within the context of the present specification to be plasticizers. Naphthenic mineral oils are preferred. The bitumen as well, already listed separately, could be classed under the heading of the plasticizers.

In one optional embodiment, the curable compound 10 comprises further auxiliaries and additives such as, for example, rheological additives, ageing inhibitors (antioxidants), light stabilizers or UV absorbers. Examples of rheological additives are pyrogenic, hydrophobized or non-hydrophobized silicas, phyllosilicates (bentonites), high molecular mass polyamide powders or castor oil derivative powders. The stated rheological additives may also be classed under the heading of fillers. The suitable antioxidants include, for example, sterically hindered phenols, hydroquinone derivatives, amines, organic sulphur compounds or organic phosphorus compounds.

Light stabilizers employed are, for example, the compounds disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148, and in Ullmann (4.) 8, 21; 15, 529, 676, all of which are incorporated by reference herein.

In one advantageous embodiment, the meltable polybutadiene-polyurethane is a reaction product prepared by a polyaddition reaction of at least one polybutadiene-diol, at least one chain extender having a hydroxyl functionality of two and a molar mass of less than or equal to 300 g/mol and optionally at least one polybutadiene-polyol having a number-averaged average functionality of between greater than 2.0 and less than or equal to 3.0 with at least one aliphatic or alicyclic diisocyanate.

Chain extenders in the sense of this specification are all hydroxyl-bearing compounds having a hydroxyl functionality of two and a molar mass of less than or equal to 300 g/mol. They carry no further isocyanate-reactive groups. They are therefore diols having a molar mass of less than or equal to 300 g/mol. It is known that many chain extenders used in the preparation of polyurethanes based on polyester-polyols or polyether-polyols are not compatible with polybutadiene-diols and polyols. Separation occurs. Inventively preferred are the chain extenders that are compatible with polybutadiene-diols and polyols. These are, for example, N,N-diisopropanol¬aniline (CAS No. 003077-13-2), 2,2,4-trimethyl-1,3-pentanediol (CAS No. 144-19-4) and 2-butyl-2-ethyl-1,3-propanediol (CAS No. 115-84-4). Particularly preferred is 2-ethyl-1,3-he¬xanediol (CAS No. 94-96-2).

In the optional examples, where the curable compound is an adhesive, in order to achieve high tack while at the same time avoiding excessive softness in the polybutadiene-polyurethane, which would lead to reduced shear strength, it is advantageous if the numerical proportion of the hydroxyl groups introduced for forming the polybutadiene-polyurethane that originate from the at least one chain extender is between greater than or equal to 20.0% and less than or equal to 80.0%, preferably between greater than or equal to 30.0% and less than or equal to 70.0%. The numerical fraction always corresponds to the amount-of-substance fraction.

A polybutadiene-diol in this specification refers to all hydroxyl-functionalized polybutadienes or derivatives thereof whose number-averaged average hydroxyl functionality is two or somewhat less than two, but at least 1.5, preferably at least 1.8. The number-averaged average hydroxyl functionality of a polybutadiene-diol is in no case greater than two. A polybutadiene-polyol for the purposes of this specification refers to all hydroxyl-functionalized polybutadienes or derivatives thereof having a number-averaged average functionality of between greater than 2.0 and less than or equal to 3.0. The number-averaged average hydroxyl functionality is understood to be the average number of hydroxyl groups per molecule of a polyol. In this specification, it is expressed relative to the number-averaged average molecular weight of the polyol in question, and is calculated according to the following formula:

$$f=M_n[g/mol]\times OHN\ [mmol\ OH/kg]/10^6$$

f is the number-averaged average hydroxyl functionality. $M_n$ is the number-averaged average molecular weight of the respective polyol in the units [g/mol] and OHN is the hydroxyl number of the polyol in the units [mmol OH/kg]. The hydroxyl number is a measure of the amount of hydroxyl groups in a polyol. The hydroxyl number is determined here according to DIN 53240. According to this method, the hydroxyl number (OHN) is expressed in the units [mg KOH/g]. It corresponds to the amount of KOH in [mg] which is equivalent to the amount of acetic acid bound in the acetylation of 1 g of polyol. For simplification of the formula calculations, the hydroxyl number in this specification is converted to the units [mmol OH/kg]. This is done according to the following formula:

$$OHN\ [mmol\ OH/kg]=OHN\ [mg\ KOH/g]\times 1000/56.1.$$

56.1 here is the molar mass of KOH.

The bonding of the hydroxyl groups of the polybutadiene-diols and -polyols to the polybutadiene chain may be primary or secondary. The butadiene units of the polybutadiene chain may be linked with one another in a 1,4 cis or trans form or in a 1,2 form with vinyl groups in the side chain, or in a mixed way. Polybutadiene-diols are prepared by anionic polymerization, whereas polybutadiene-polyols having a number-averaged average functionality of between greater than 2.0 and less than or equal to 3.0 are prepared by radical polymerization.

To achieve high tack it is advantageous to use polybutadiene-diols having a number-averaged average molar mass of between greater than 1000 g/mol and less than 5000 g/mol, preferably between greater than or equal to 2000 g/mol and less than or equal to 3000 g/mol.

For the same reason, the optional polybutadiene-polyols having a number-averaged average functionality of between greater than 2.0 and less than or equal to 3.0 ought also to have a number-averaged average molar mass of between greater than 1000 g/mol and less than 5000 g/mol, preferably between greater than or equal to 2000 g/mol and less than or equal to 3000 g/mol. The polybutadiene-polyols having a number-averaged average functionality of between greater than 2.0 and less than or equal to 3.0 may be used optionally for producing the polybutadiene-polyurethane, in order to incorporate branching sites into the polyurethane. A certain degree of branching would have the advantage of reduced softening on the part of the coated polyurethane during thermal vulcanization, in the course of the supplying of temperature but before the onset of the vulcanization reaction, and hence of a greater shear strength in this phase immediately prior to the curing brought about by the vulcanization.

If also using the optional polybutadiene-polyols having a number-averaged average functionality of between greater than 2.0 and less than or equal to 3.0 for producing the polybutadiene-polyurethane, it is necessary to ensure that no gelling occurs, in other words that the degree of branching in relation to the length of the prepolymer chains produced is not so high that there is crosslinking during the polyaddition reaction. A degree of branching is set such as to ensure the meltability of the polybutadiene-polyurethane, in other words such that no crosslinked structures are formed. In order to rule out crosslinked structures, it is mandatory not to exceed what is called the gel point. The theoretical gel point can be calculated using the gel point equation of P. J. Flory. A formula derived from the Flory equation and used for estimating the gelling NCO/OH ratio in reactions of polyurethane formation from diols and triols with diisocyanates in deficit reads as follows:

$$\left(\frac{NCO}{OH}\right)_{gelling} = \frac{1}{1 + \frac{1}{\frac{(diol\text{-}OH)}{(triol\text{-}OH)} + 1}}$$

Diol-OH in this formula refers to the total number of hydroxyl groups involved in the polyurethane formation reaction and originating from polyols whose hydroxyl functionality is less than or equal to two. This also includes the chain extenders. Triol-OH refers to the total number of hydroxyl groups involved in the polyurethane formation reaction and bonded to polyols whose functionality is greater than two and less than or equal to three.

If the gelling NCO/OH ratio is reached or exceeded, there is a likelihood that crosslinked structures will form, and therefore that gelling will ensue. The formula provides only an approximate starting point, but nevertheless one which is generally sufficient for practical purposes, for determining the NCO/OH ratio at which gelling actually occurs. If operating with diisocyanates in excess, in other words if the NCO/OH ratio is greater than 1.0, the above formula should be applied reciprocally. The numerical fraction of the hydroxyl groups introduced for forming the polybutadiene-polyurethane and originating from the optional at least one polybutadiene-polyol having a number-averaged average functionality of between greater than 2.0 and less than or equal to 3.0 is advantageously not more than 50.0%, preferably not more than 30.0%, more preferably not more than 10%. Higher fractions require a disadvantageously low NCO/OH ratio in the case of NCO deficit, or a disadvantageously high NCO/OH ratio in the case of NCO excess, which would result in an advantageously low softening temperature of the hydroxyl-functionalized polybutadiene-polyurethane hot-melt prepolymer. With regard to operational reliability, the fraction is especially advantageously 0.0%. At a fraction of 0.0%, the risk of premature formation of crosslinked structures, in other words the onset of gelling during polyurethane production, is the lowest. The polybutadiene-polyurethane is obtained by reaction of the stated diols/polyols with at least one aliphatic or alicyclic diisocyanate.

Aliphatic or alicyclic diisocyanates are understood in this specification to be all organic polyisocyanates having an isocyanate functionality of two in which the isocyanate groups are not bonded directly to a ring system which is aromatic in accordance with Hückel's rule. Examples of aliphatic or alicyclic diisocyanates are butane 1,4-diisocyanate, tetramethoxybutane 1,4-diisocyanate, hexane 1,6-diisocyanate, ethylene diisocyanate, 2,2,4-trimethylhexamethylene diisocyanate, ethylethylene diisocyanate, dicyclohexylmethane 4,4'-diisocyanate (H12MDI), 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophoronediisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-iso-cyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-iso-cyanato-2-(3-isocyanatoprop-1-yl)-cyclohexane, 1-isocyanato-2-(2-isocyanatoeth-1-yl)-cyclohexane, 2-heptyl-3,4-bis(9-isocyanatononyl)-1-pentylcyclohexane, norbornane diisocyanatomethyl and also m-tetramethylxylene diisocyanate (TMXDI). Particularly preferred are isophorone diisocyanate (CAS No. 4098-71-9) and dicyclohexylmethane 4,4'-diisocyanate (CAS No. 5124-30-1).

In one advantageous embodiment, the ratio of the total number of isocyanate groups to the total number of hydroxyl groups in the substances involved in the chemical reaction to give the polybutadiene-polyurethane is between greater than or equal to 0.3 and less than or equal to 1.3, preferably between greater than or equal to 0.4 and less than or equal to 1.2, more preferably between greater than or equal to 0.5 and less than or equal to 1.1, especially preferably between greater than or equal to 0.6 and less than or equal to 1.0. The preferred ratios result in hot-melt polyurethanes having a particularly firm consistency at room temperature and at the same time a high adhesiveness (high tack).

The polybutadiene-polyurethane of the invention preferably comprises the chemical reaction product of exclusively one or more polybutadiene-diols, optionally one or more polybutadiene-polyols having a number-averaged average functionality of between greater than 2.0 and less than or equal to 3.0, and one or more chain extenders having a hydroxyl functionality of two and a molar mass of less than or equal to 300 g/mol with one or more aliphatic or alicyclic diisocyanates. Preferably, therefore, there are no additional, other polyols or isocyanates involved in the chemical reaction to give the polybutadiene-polyurethane, and more particularly no polyether-polyols, no polyester-polyols and no aromatic diisocyanates. It is assumed that when the polybutadiene-polyurethane of the invention is used as a base elastomer in the production of a thermally vulcanizable, meltable, curable compound, polyether-polyols and polyester-polyols have disadvantageous consequences for the adhesion properties after the vulcanization reaction, especially for the adhesion properties on oiled metal sheets. It is further assumed that aromatic diisocyanates are disadvantageous for the adhesiveness (the tack).

To accelerate the reaction, the chemical conversion to form the polybutadiene-polyurethane takes place preferably with addition of a catalyst. It is possible to use one or more catalysts known to the skilled person, such as, for example, tertiary amines, organobismuth or organotin compounds, to name but a few. Advantageously, it is possible to use catalysts containing bismuth and carbon, preferably a bismuth carboxylate or a bismuth carboxylate derivative. Particularly advantageous is bismuth-trisneodecanoate (CAS No. 34364-26-6). The concentration of the catalysts is tailored to the desired reaction rate and is situated typically at between 0.01 wt % and 0.5 wt % of the polybutadiene-polyurethane to be prepared. The polybutadiene-polyurethane is preferably prepared without the use of solvents. Including solvents in the production operation, while readily possible technically, does not normally bring any advantages.

The polybutadiene-polyurethane is advantageously produced batchwise, in other words discontinuously, for example, in a heatable mixing vessel, kneading apparatus, planetary mixer or dissolver. In order to achieve absence of bubbles, mixing takes place in the end phase of the operation, when the chemical reaction is largely concluded, preferably under reduced pressure.

Continuous Polymer Phase-Reactive Resin Curable Compound

In another specific example, the curable compound 10 is a polymer forming a continuous phase and have a reactive resin dissolved and/or dispersed therein to form the discontinuous phase. This specific example of a curable compound may have a large resin fraction, for example, the reactive resin fraction may comprise up to 85 wt. % of the curable compound.

In the uncured state, the reactive resins are preferably present at least partly in homogeneous solution in the continuous phase. In one particularly advantageous embodiment, the reactive resin is present fully in homogeneous solution in the polymer, and so in the cured state a continuous epoxide phase is formed, producing shear strengths comparable to those of the liquid epoxide adhesives. As used herein, "in homogeneous solution" means that under a scanning electron microscope there are no different phases apparent between dissolved material and solvating material.

With particular preference the curable compound comprises at least 120 parts of reactive resin per 100 parts of polymer and, optionally, tackifier resin, preferably at least 200 parts of reactive resin, more particularly at least 300 parts of reactive resin. "Part" here is based on parts by weight. As used herein, the wording "at least 120 parts of reactive resin per 100 parts of polymer" means that at least 120 g are used for 100 g of polymer. Where tackifier resin is also present, the parts of polymer and tackifier resin are combined. In this case, where more than one reactive resin is used, the figures are based on the sum of the parts by weight of the reactive resins; where more than one polymer is used, on the sum of the parts by weight of the polymers used, with the addition, where appropriate, of the amount of the tackifier resin or of the sum of the parts by weight of the tackifier resins used.

As a reactive resin, there is preference given to using an epoxy resin. With epoxy resins, curable compounds of particularly high shear strength can be produced. Moreover, the crosslinking reactions are readily initiated and managed. In the uncured state, the curable compounds produced using epoxy resins are sufficiently storage-stable. Particularly preferred as reactive resin here is at least one epoxy resin based on bisphenol A, bisphenol S, bisphenol F, an epoxy novolak, an epoxy-cresol novolak or an epoxidized nitrile rubber.

The concentration and species of epoxy resin chosen may influence the rigidity of the cured rigid cable harness. As such, the epoxy resin of the continuous polymer phase-reactive resin embodiment of the curable compound may be selected to provide a rigid cable harness with a desired degree of rigidity.

The polymer may be one polymer, or else a mixture of two or more different polymers. This at least one polymer may more particularly be an elastomer or a thermoplastic. Examples of polymers my include, but are not limited to, elastomers of the kind customarily used in the pressure sensitive adhesives field, as are described for example in the "Handbook of Pressure Sensitive Adhesive Technology" by Donatas Satas (Satas & Associates, Warwick 1999), incorporated herein by reference. These are, for example, elastomers based on acrylates and/or methacrylates, polyurethanes, natural rubbers, synthetic rubbers such as butyl, (iso)butyl, nitrile or butadiene rubbers, styrene block copolymers with an elastomer block composed of unsaturated or partly or fully hydrogenated polydiene blocks (polybutadiene, polyisoprene, poly(iso)butylenes, copolymers of these, and also further elastomer blocks familiar to the skilled person), polyolefins, fluoropolymers and/or silicones. Where rubber or synthetic rubber or blends produced from them are used as base material for the adhesive, then the natural rubber may be selected in principle from all available grades such as, for example, crepe, RSS, ADS, TSR or CV products, depending on required level of purity and of viscosity, and the synthetic rubber or the synthetic rubbers may be selected from the group of the randomly copolymerized styrene-butadiene rubbers (SBR), the butadiene rubbers (BR), the synthetic polyisoprenes (IR), the butyl rubbers (IIR), the halogenated butyl rubbers (XIIR), the acrylate rubbers (ACM), the ethylene-vinyl acetate copolymers (EVA) or the polyurethanes and/or blends thereof.

As the at least one polymer it is also possible for any kind of thermoplastics known to the skilled person to be used, as are stated for example in the textbooks "Chemie and Physik der synthetischen Polymere" by J. M. G. Cowie (Vieweg, Braunschweig) and "Makromolekulare Chemie" by B. Tieke (VCH Weinheim, 1997), incorporated by reference herein. These are, for example, poly(ethylene), poly(propylene), poly(vinyl chloride), poly(styrene), poly(oxymethylenes), poly(ethylene oxide), poly(ethylene terephthalate), poly(carbonates), poly(phenylene oxides), poly(urethanes), poly(ureas), acrylonitrile-butadiene-styrene (ABS), poly(amides) (PA), poly(lactate) (PLA), poly(etheretherketone) (PEEK), poly(sulphone) (PSU), poly(ethersulphone) (PES). Poly (acrylates), poly(methacrylates) and poly(methyl methacrylates) (PMMA) are likewise possible as polymer, but are not preferred for the purposes of the present invention.

The selection of the polymer component is dependent on the resin system chosen. Where polar epoxides are used (frequently prepared by reaction of alcohols with epichlorohydrin, such as the reaction product of bisphenol A and epichlorohydrin, for example), more polar polymers are especially preferred. These include both elastomers such as acrylonitrile-butadiene rubbers and thermoplastics such as poly(ethylene oxide), poly(ethylene terephthalate), poly(carbonates), poly(phenylene oxides), poly(urethanes), poly(ureas), poly(amides) (PA), poly(lactate) (PLA), poly(etheretherketone) (PEEK), poly(sulphone) (PSU) and poly(ethersulphone) (PES). For less polar epoxides such as dicyclopentadiene diepoxide, for example, less polar polymers are preferred. These are, for example, poly(styrene), styrene block copolymers with an elastomer block composed of unsaturated or partly or fully hydrogenated polydiene blocks (polybutadiene, polyisoprene, poly(iso)butylene, copolymers of these, and also further elastomer blocks familiar to the skilled person), or thermoplastic polyolefins, fluoropolymers and/or silicones.

In order to obtain curable compounds having particularly high epoxide contents, particularly suitable polymers are all those which are not intrinsically pressure-sensitively adhesive, and which in other words do not meet the Dahlquist criterion at room temperature (cf. J. Adhesion, 1991, vol. 34, pp. 189-200 or C. A. Dahlquist: Tack, adhesion, fundamentals and practice, McLaren and Sons Ltd., London, 1966), incorporated by reference herein. This applies both to the polymer component and to the mixture of polymer and tackifier resin, where such is used. Although, therefore, polymer and optionally tackifier resin per se are not pressure-sensitively adhesive, the resulting curable compound may be a pressure-sensitive adhesive in some embodiments.

Particularly advantageous polymers for very high bond strengths are poly(amides), polyurethanes, acrylonitrile-butadiene rubbers and poly(ureas), poly(etheretherketone) (PEEK), poly(sulphone) (PSU) and poly(ethersulphone) (PES). Where polyurethanes are employed, they have been found to be particularly advantageous for good peel adhesions in the uncured state if the polyurethane is semicrystalline and in the DSC measurement has a melting peak or crystallization peak which corresponds to an enthalpy of fusion of at least 5 J/g, preferably of 25 J/g and more preferably of 40 J/g.

The polymers of the polymer mixture may be of linear, branched, star-shaped or grafted structure, to give only a few examples, and may have a homopolymer, random copolymer, alternating copolymer or block copolymer construction. As used herein, the designation "random copolymer" includes not only those copolymers in which the comonomers used in the polymerization are incorporated purely statistically, but also those in which there are gradients in the comonomer composition and/or local accumulations of individual comonomer varieties in the polymer chains. Individual polymer blocks may be constructed as a copolymer block (random or alternating).

In one particularly preferred embodiment, the polymer of the curable compound is chemically crosslinked after coating and before use. This improves the technical adhesive properties in the uncured state. This becomes particularly clear under shearing load with simultaneous temperature elevation in the test known as the SAFT test (shear adhesion failure temperature). The more cohesive the adhesive, the smaller the shear travel. Adhesives are characterized using short-term temperature stability (STTS), defined as the temperature at which the shear travel reaches 1000 μm.

The chemical crosslinking of the polymer preferably takes place under induction by radiation or via the addition of a crosslinking agent, where the crosslinking agent contains, in particular, at least 2 reactive groups selected from the group consisting of isocyanates, alkoxysilanes and alkyl halides, optionally with addition of a polyfunctional (i.e., f>1) alcohol or amine having a molar mass M<10 000 g/mol. The functionality f here denotes the average number of functional groups per molecule.

Optionally, tackifier resins may be used for this embodiment of the curable compound. The curable compound may comprise at least one variety of a preferably at least partly hydrogenated tackifier resin, examples being those which are compatible with the elastomer component or, where a copolymer composed of hard blocks and soft blocks is used, are compatible primarily with the soft block (plasticizer resins). A corresponding tackifier resin may have a softening temperature, measured by the ring & ball method, of more than 25° C., and also, as a supplement, at least one variety of tackifier resin having a softening temperature of less than 20° C.

For relatively apolar elastomers, resins which can be used in the curable compound are partially or fully hydrogenated resins based on rosin and rosin derivatives, hydrogenated polymers of dicyclopentadiene, partially, selectively or fully hydrogenated hydrocarbon resins based on C5, C5/C9 or C9 monomer streams, polyterpene resins based on α-pinene and/or β-pinene and/or δ-limonene and/or Δ3-carene, hydrogenated polymers of preferably pure C8 and C9 aromatics. Aforesaid tackifier resins may be used either alone or in a mixture.

It is possible here to employ both room-temperature-solid resins and liquid resins. In order to ensure high ageing stability and UV stability, hydrogenated resins having a degree of hydrogenation of at least 90%, preferably of at least 95%, are preferred.

Examples of some reactive resins include, but are not limited to, epoxides, polyesters, polyethers, polyurethanes, phenolic resin, cresol or novolak based polymers, polysulphides or acrylic polymers (acrylic, methacrylic). The construction and the chemical nature of the reactive resins component is not critical, provided that the synthesis reaction can be carried out under conditions—especially with regard to the temperatures employed, nature of the catalysts used and the like—that do not lead to any substantial adverse effect and/or decomposition of the polymer phase, it being preferably at least partly miscible with the elastomer phase. Preferably at least one of the at least one reactive resin is a solid having a softening temperature of at least 45° C. or has a viscosity at 25° C. of at least 20 Pa s, preferably 50 Pa s, more particularly at least 150 Pa s.

Epoxide-containing materials or epoxy resins may be any organic compounds having at least one oxirane ring that are polymerizable by a ring-opening reaction. Such materials, referred to generally as epoxides, include both monomeric and polymeric epoxides and may be aliphatic, cycloaliphatic or aromatic. These materials generally have on average at least two epoxide groups per molecule, preferably more than two epoxide groups per molecule. The "average" number of epoxide groups per molecule is defined as the number of epoxide groups in the epoxide-containing material divided by the total number of epoxide molecules present. The polymeric epoxides include linear polymers having terminal epoxide groups (e.g. a diglycidyl ether of a polyoxyalkylene glycol), polymers having skeletal oxirane units (e.g. polybutadiene-polyepoxide) and polymers having epoxide side groups (e.g. a glycidyl methacrylate polymer or copolymer). The molecular weight of the epoxide-containing material may vary from 58 to about 100 000 g/mol or more. Mixtures of different epoxide-containing materials may also be used in the hot-melt compositions of the invention. Useful epoxide-containing materials include those which comprise cyclohexene oxide groups, such as the epoxycyclohexanecarboxylates, exemplified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. For a more detailed list of useful epoxides of this kind, reference may be made to U.S. Pat. No. 3,117,099.

Further epoxide-containing materials which are particularly useful in the application of this invention include glycidyl ether monomers. Examples are the glycidyl ethers of polyhydric phenols which are obtained by reaction of a polyhydric phenol with an excess of chlorohydrins, such as epichlorohydrin (e.g. the diglycidyl ether of 2,2-bis(2,3-epoxypropoxyphenol)propane). Further examples of epoxides of this type which may be used in the application of this invention are described in U.S. Pat. No. 3,018,262 A.

There are a host of commercially available epoxide-containing materials which can be used in this invention. In particular, epoxides which are readily obtainable include octadecylene oxide, epichlorohydrin, styrene oxide, vinylcyclohexene oxide, glycidol, glycidyl methacrylate, diglycidyl ethers of bisphenol A, diglycidyl ethers of bisphenol F, vinylcyclohexene dioxide, 3,4-epoxycyclohexylmethyl 3,4-epoxycyclohexenecarboxylate, 2-(3,4-epoxycyclohexyl-5, 5-spiro-3,4-epoxy)cyclohexane-metadioxane, bis(3,4-epoxycyclohexyl) adipate, dipentene dioxide, epoxidized polybutadiene, silicone resin-containing epoxide functionality, epoxysilanes (e.g. beta(3,4-epoxycyclohexyl)ethyltrimethoxysilane and gamma-glycidoxypropyl-trimethoxysilane), flame retardant epoxy resins (e.g. brominated bisphenol-type epoxy resins), 1,4-butanediol diglycidyl ether, hydrogenated epoxy resins based on bisphenol A epichlorohydrin, and polyglycidyl ethers of phenol-formaldehyde novolak.

The curable compound may further comprise an accelerator as well. The effect of this accelerator is to lower the starting temperature for the crosslinking reaction of the reactive resin. The management on adhesive bonding is improved as a result. It should be borne in mind here that the starting temperature lowered through the addition of an accelerator goes hand in hand, as a disadvantage, with a reduced storage stability, since the lowering of the starting temperature also has the effect of unwanted increased reaction during storage. As accelerators, it is possible in particular for modified and unmodified imidazoles, urea derivatives, acid anhydrides, tertiary amines, polyamines and a combination thereof to be employed.

The curable compound further comprises at least one curing agent or initiator. Curing agents are, for example, aliphatic amines, aromatic amines, modified amines, polyamide resins, acid anhydrides, secondary amines, mercaptans, especially polymercaptans, polysulphides, dicyandiamide, organic acid hydrazides. Initiators for initiating a ring-opening polymerization of epoxides are, for example, imidazoles, boron trifluoride-amine complexes, tertiary amines, amine-blocked and/or ammonium-blocked thermal acid donors such as tetrabutylammonium triflate, ammonium triflate, amine-blocked dodecylbenzylsulphonic acid, and lanthanide triflates such as ytterbium(III), samarium (III), cerium(III), erbium(III), lanthanum(III) and dysprosium(III) trifluoromethanesulphonate. Among the initiators for a cationic UV-induced curing it is possible in particular to use sulphonium, iodonium and metallocene based systems. For examples of sulphonium based cations, reference may be made to the details in U.S. Pat. No. 6,908,722 B1, incorporated by reference herein. Examples of anions which serve as counterions to the cations identified above include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis-(pentafluoromethylphenyl)borate, bi(trifluoromethylsulphonyl)amides and tris(trifluoromethylsulphonyl)methides. Further conceivable, especially for iodonium-based initiators, are also chloride, bromide or iodide anions, although preference is given to initiators which are substantially free from chlorine and bromine.

More specifically, the useful systems include, but are not limited to, sulphonium salts (see, for example, U.S. Pat. Nos. 4,231,951 A, 4,256,828 A, 4,058,401 A, 4,138,255 A and US 2010/063221 A1, all incorporated by reference herein) such as triphenylsulphonium hexafluoroarsenate, triphenylsulphonium hexafluoroborate, triphenylsulphonium tetrafluoroborate, triphenylsulphonium tetrakis(pentafluorobenzyl) borate, methyldiphenylsulphonium tetrafluoroborate, methyldiphenylsulphonium tetrakis(pentafluorobenzyl)borate, dimethylphenylsulphonium hexafluorophosphate, triphenylsulphonium hexafluorophosphate, triphenylsulphonium hexafluoroantimonate, diphenylnaphthylsulphonium hexafluoroarsenate, tritolylsulphonium hexafluorophosphate, anisyldiphenylsulphonium hexafluoroantimonate, 4-butoxyphenyldiphenylsulphonium tetrafluoroborate, 4-chlorophenyldiphenylsulphonium hexafluoroantimonate, tris(4-phenoxyphenyl)-sulphonium hexafluorophosphate, di(4-ethoxyphenyl)methylsulphonium hexafluoroarsenate, 4-acetylphenyldiphenylsulphonium tetrafluoroborate, 4-acetylphenyldiphenyl sulphonium tetrakis(pentafluorobenzyl)borate, tris(4-thiomethoxyphenyl)sulphonium hexafluorophosphate, di(methoxysulphonylphenyl)-methylsulphonium hexafluoroantimonate, di(methoxynaphthyl)-methylsulphonium tetrafluoroborate, di(methoxynaphthyl)-methylsulphonium tetrakis(pentafluorobenzyl)-borate, di(carbomethoxyphenyl)methylsulphonium hexafluorophosphate, (4-octyloxyphenyl)diphenyl sulphonium tetrakis (3,5-bis(trifluoromethyl)phenyl)borate, tris[4-(4-acetylphenyl)thiophenyl]sulphonium tetrakis(pentafluorophenyl) borate, tris(dodecylphenyl)sulphonium tetrakis(3,5-bis (trifluoromethyl)phenyl)borate, 4-acetamidophenyldiphenyl sulphonium tetrafluoroborate, 4-acetamidophenyldiphenylsulphonium tetrakis(pentafluorobenzyl)borate, dimethylnaphthylsulphonium hexafluorophosphate, trifluoromethyldiphenylsulphonium tetrafluoroborate, trifluoromethyldiphenylsulphonium tetrakis(pentafluorobenzyl)borate, phenylmethyl-benzylsulphonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis (pentafluorobenzyl)borate, 5-methyl-10-oxothianthrenium tetrafluoroborate, 5-methyl-10-oxothianthrenium tetrakis (pentafluorobenzyl)borate and 5-methyl-10,10-dioxothianthrenium hexafluorophosphate; and/or iodonium salts (see, for example, U.S. Pat. Nos. 3,729,313 A, 3,741,769 A, 4,250,053 A, 4,394,403 A and US 2010/063221 A1, all incorporated by reference herein) such as diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyhiodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di(2,4-dichlorophenyl)iodonium hexafluorophosphate, di(4-bromophenyl)iodonium hexafluorophosphate, di(4-methoxyphenyl)-iodonium hexafluorophosphate, di(3-carboxyphenyl)iodonium hexafluorophosphate, di(3-methoxycarbonylphenyl)iodonium hexafluorophosphate, di(3-methoxysulphonyl-phenyl)iodonium hexafluorophosphate, di(4-acetamidophenyl)iodonium hexafluorophosphate, di(2-benzothienyl)iodonium hexafluorophosphate, diaryliodonium tristrifluoromethylsulphonylmethide such as diphenyliodonium hexafluoroantimonate, diaryliodonium tetrakis(pentafluorophenyl)borate such as diphenyliodonium tetrakis-(pentafluorophenyl)borate, (4-n-desiloxyphenyl)phenyliodonium hexafluoroantimonate, [4-(2-hydroxy-n-tetradesiloxy)phenyl]phenyliodonium hexafluoroantimonate, [4-(2-hydroxy-n-tetradesiloxy)phenyl]phenyliodonium trifluorosulphonate, [4-(2-hydroxy-n-tetradesiloxy)phenyl]phenyliodonium hexafluorophosphate, [4-(2-hydroxy-n-tetradesiloxy)phenyl]phenyliodonium tetrakis(pentafluorophenyl)borate, bis(4-tert-butylphenyl)iodonium hexafluoroantimonate, bis(4-tert-butylphenyl)iodonium hexafluorophosphate, bis(4-tert-butylphenyl)iodonium trifluorosulphonate, bis(4-tert-butylphenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulphonate, di(dodecyl-phenyl)iodonium hexafluoroantimonate, di(dodecylphenyl)iodonium triflate, diphenyliodonium bisulphate, 4,4'-dichlorodiphenyliodonium bisulphate, 4,4'-dibromo-diphenyliodonium bisulphate, 3,3'-dinitrodiphenyliodonium bisulphate, 4,4'-dimethyl-diphenyliodonium bisulphate, 4,4'-bis(succinimidodiphenyl)iodonium bisulphate, 3-nitrodiphenyliodonium bisulphate, 4,4'-dimethoxydiphenyliodonium bisulphate, bis(dodecylphenyl)iodonium tetrakis(pentafluorophenyl)borate, (4-octyloxyphenyl)-phenyliodonium tetrakis(3,5-bis-trifluoromethylphenyl)borate and (tolylcumyl)iodonium tetrakis(pentafluorophenyl)borate; and/or ferrocenium salts (see, for example, EP 542 716 B1) such as η5-(2,4-cyclopentadien-1-yl)-[(1,2,3,4,5,6,9)-(1-methylethyl)benzene] iron.

The curable compound may, optionally, comprise further additives, rheology modifiers, foaming agents, fillers, adhesion promoters, or a combination thereof.

Examples of further additives include, but are not limited to, plasticizing agents such as, for example, plasticizer oils, or low molecular mass liquid polymers, such as low molecular mass polybutenes, for example, preferably with a fraction of 0.2 to 5 wt %, based on the total weight of the curable compound; primary antioxidants such as, for example, sterically hindered phenols, preferably with a fraction of 0.2 to 1 wt %, based on the total weight of the curable compound; secondary antioxidants, such as, for example, phosphites or thioethers, preferably with a fraction of 0.2 to 1 wt %, based on the total weight of the curable compound; process stabilizers such as, for example, C radical scavengers, preferably with a fraction of 0.2 to 1 wt %, based on the total weight of the pressure sensitive adhesive; light stabilizers such as, for example, UV absorbers or sterically hindered amines, preferably with a fraction of 0.2 to 1 wt %, based on the total weight of the curable compound; processing aids, preferably with a fraction of 0.2 to 1 wt %, based on the total weight of the curable compound; end-block reinforcer resins, preferably with a fraction of 0.2 to 10 wt %, based on the total weight of the curable compound; or further polymers preferably elastomeric in nature such as elastomers based on pure hydrocarbons, for example unsaturated polydienes such as natural or synthetically produced polyisoprene or polybutadiene, chemically essentially saturated ethylene-propylene copolymers, α-olefin copolymers, polyisobutylene, butyl rubber, ethylene-propylene rubber, and also chemically functionalized hydrocarbons such as, for example, halogen-containing, acrylate-containing, or allyl- or vinyl ether-containing polyolefins, preferably with a fraction of 0.2 to 10 wt %, based on the total weight of the curable compound.

The curable compound of any embodiment may, optionally, be foamed. This optional foaming may be performed by means of any desired chemical and/or physical methods. Preferably, however, a foamed curable compound is obtained by the introduction and subsequent expansion of microballoons.

EXAMPLES

The present disclosure may be better understood by reference to the following examples, which are offered by way of illustration. The present disclosure is not limited to the examples provided herein.

Example 1

Example 1 was performed to test the form retention of the sample when subjected to longitudinal pressure. A 30 cm long bundle of ETFE 24 wires were wrapped with a single layer of the rigid tape over 25 mm length. The bundles were tied together with steel wire to form a horseshoe. The bundles were subjected to curing at 160° C. for 30 Minutes. After cooling down, the steel wire was removed and the distance between the two ends of the cable bundle were measured (about 60 mm). The two ends of the cable bundles were placed in one mechanical clamp. The top of the bundle/horseshoe was also placed in a mechanical clamp. In the beginning, the clamps were 150 mm apart. The clamps were moved towards each other to exert compression force on the sample. The compression was stopped when the clamps were 20 mm apart resulting in complete deformation of the sample. The compression was released. No cracking was found in either of the bundles. The bundle returned close to the original form with a cable end-to-end distance of about 55 mm.

Example 2

Example 2 was performed to test the form retention of the sample when subjected to lateral pressure. A 30 cm long bundle of ETFE 24 wires were wrapped with a single layer of the rigid tape over 25 mm length. The bundles were tied together with steel wire to form a horseshoe. The bundles were subjected to curing at 160° C. for 30 Minutes. After cooling down, the steel wire was removed and the distance between the two ends of the cable bundle were measured (about 70 mm). The two ends of the cable bundles were placed one mechanical clamp each. In the beginning, the clamps were 150 mm apart. The clamps were moved towards each other to exert compression force on the sample. The compression was stopped when the clamps were 20 mm apart resulting in complete deformation of the sample. The compression was released. No cracking was found in either of the bundles. The bundle returned close to the original form with a cable end-to-end distance of about 60 mm.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for forming a rigid cable harness comprising:
providing a curable sleeve comprising a curable compound, an adhesive, and a backing; wherein the curable compound is thermally vulcanizable, meltable, and comprises a polybutadiene-polyurethane and ground sulfur; wherein the curable compound further comprises at least one additional component selected from the group consisting of vulcanization accelerator, filler, epoxy resin, tackifier resin, bitumen, plasticizer, and any combination thereof; wherein the curable sleeve has a longitudinal direction;
placing a plurality of cables on the sleeve in the longitudinal direction;
wrapping the curable sleeve around the placed plurality of cables to form a cable harness, wherein the wrapping comprises wrapping the plurality of cables with the curable sleeve in the longitudinal direction;
positioning the cable harness into a desired shape; and
curing the curable compound of the cable harness to form the rigid cable harness, wherein the rigid cable harness has the desired shape.

2. The method of claim 1, wherein the curing the curable compound further comprises applying radiant energy selected from the group consisting of heat, ultraviolet radiation, infrared radiation, magnetic induction, and any combination thereof.

3. The method of claim 2, wherein the degree of rigidity of the rigid cable harness is selected by choosing the duration, temperature, or source of radiant energy to cure the curable compound.

4. The method of claim 1, wherein the curable compound is covered with a covering during the placing of the plurality of cables on the curable sleeve; wherein the plurality of cables does not contact the curable compound.

5. The method of claim 1, wherein the rigid cable harness comprises an exterior and an interior; wherein the exterior of the rigid cable harness does not comprise the curable compound; wherein the curable compound and the adhesive do not substantially extrude out of the interior of the rigid cable harness or substantially contact the exterior of the rigid cable harness.

6. The method of claim 1, wherein the polybutadiene-polyurethane is the meltable reaction product of a polyaddition reaction of at least one at least doubly hydroxyl-functionalized polybutadiene or polybutadiene derivative and at least one diisocyanate.

7. The method of claim 1, wherein the degree of rigidity of the rigid cable harness is selected by choosing the concentration of the ground sulfur.

8. The method of claim 1, wherein the curable compound comprises a polymer forming a continuous phase and a reactive resin forming a discontinuous phase in the uncured state of the curable compound; wherein the curable compound further comprises at least one of a curing agent, an initiator, or an accelerator.

9. The method of claim 8, wherein the degree of rigidity of the rigid cable harness is selected by choosing the concentration and species of the reactive resin.

10. The method of claim 1, wherein the backing comprises a textile material selected from the group consisting of cloths, scrims, tapes, braids, tufted textiles, felts, woven fabrics, woven or knitted spacer fabrics with lamination, knitted fabrics, nonwovens, and any combinations thereof.

11. A method for cabling a structure comprising:
providing a cable harness comprising:
a curable sleeve comprising a curable compound, an adhesive, and a backing; wherein the curable compound is thermally vulcanizable, meltable, and comprises a polybutadiene-polyurethane and around sulfur; wherein the curable compound further comprises at least one additional component selected from the group consisting of vulcanization accelerator, filler, epoxy resin, tackifier resin, bitumen, plasticizer, and any combination thereof; wherein the curable sleeve has a longitudinal direction; and
a plurality of cables placed on the interior of the curable sleeve in the longitudinal direction and wrapped by the curable sleeve in the longitudinal direction;
positioning the cable harness into a desired shape;
curing the curable compound of the cable harness to form a rigid cable harness, wherein the rigid cable harness has the desired shape, wherein the degree of rigidity of the rigid cable harness is selected by choosing the duration, temperature, or source of radiant energy to cure the curable compound; and
placing the rigid cable harness on the interior of the structure.

12. The method of claim 11, wherein the curable compound is covered with a covering during the placing of the plurality of cables on the curable sleeve in the longitudinal direction; wherein the plurality of cables does not contact the curable compound.

13. The method of claim 11, wherein the rigid cable harness comprises an exterior and an interior; wherein the exterior of the rigid cable harness does not comprise the curable compound; wherein the curable compound and the adhesive does not substantially extrude out of the interior of the rigid cable harness or substantially contact the exterior of the rigid cable harness.

14. The method of claim 11, wherein the polybutadiene-polyurethane is the meltable reaction product of a polyaddition reaction of at least one at least doubly hydroxyl-functionalized polybutadiene or polybutadiene derivative and at least one diisocyanate.

15. The method of claim 11, wherein the curable compound comprises a polymer forming a continuous phase and a reactive resin forming a discontinuous phase in the uncured state of the curable compound; wherein the curable compound further comprises at least one of a curing agent, an initiator, or an accelerator.

16. The method of claim 11, wherein the backing comprises a textile material selected from the group consisting of cloths, scrims, tapes, braids, tufted textiles, felts, woven fabrics, woven or knitted spacer fabrics with lamination, knitted fabrics, nonwovens, and any combinations thereof.

* * * * *